(12) United States Patent
Atabaki et al.

(10) Patent No.: US 11,307,092 B2
(45) Date of Patent: Apr. 19, 2022

(54) SWEPT-SOURCE RAMAN SPECTROSCOPY SYSTEMS AND METHODS

(71) Applicant: Massachusetts Institute of Technology, Cambridge, MA (US)

(72) Inventors: Amir H. Atabaki, Brookline, MA (US); Rajeev J. Ram, Arlington, MA (US); William F. Herrington, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/853,811

(22) Filed: Apr. 21, 2020

(65) Prior Publication Data
US 2021/0116298 A1    Apr. 22, 2021

Related U.S. Application Data

(63) Continuation of application No. 16/229,355, filed on Dec. 21, 2018, now Pat. No. 10,656,012.
(Continued)

(51) Int. Cl.
*G01J 3/44* (2006.01)
*G01J 3/02* (2006.01)
(Continued)

(52) U.S. Cl.
CPC .......... *G01J 3/0229* (2013.01); *G01J 1/4257* (2013.01); *G01J 3/0297* (2013.01); *G01J 3/10* (2013.01);
(Continued)

(58) Field of Classification Search
CPC ........ G01J 3/0229; G01J 3/433; G01J 3/0297; G01J 3/18; G01J 3/44; G01N 21/65; G01N 2201/06113; G02B 6/29395
See application file for complete search history.

(56) References Cited

U.S. PATENT DOCUMENTS 5,011,284 A    4/1991    Tedesco et al.
5,257,085 A    10/1993    Ulich et al.
(Continued)

FOREIGN PATENT DOCUMENTS

CN         105092560 A    11/2015

OTHER PUBLICATIONS

Austin et al., "Raman technologies in cancer diagnostics." Analyst 141.2 (2016): 476-503.
(Continued)

*Primary Examiner* — Abdullahi Nur
(74) *Attorney, Agent, or Firm* — Smith Baluch LLP

(57) ABSTRACT

In swept source Raman (SSR) spectroscopy, a swept laser beam illuminates a sample, which inelastically scatters some of the incident light. This inelastically scattered light is shifted in wavelength by an amount called the Raman shift. The Raman-shifted light can be measured with a fixed spectrally selective filter and a detector. The Raman spectrum can be obtained by sweeping the wavelength of the excitation source and, therefore, the Raman shift. The resolution of the Raman spectrum is determined by the filter bandwidth and the frequency resolution of the swept source. An SSR spectrometer can be smaller, more sensitive, and less expensive than a conventional Raman spectrometer because it uses a tunable laser and a fixed filter instead of free-space propagation for spectral separation. Its sensitivity depends on the size of the collection optics. And it can use a nonlinearly swept laser beam thanks to a wavemeter that measures the beam's absolute wavelength during Raman spectrum acquisition.

20 Claims, 12 Drawing Sheets

Tunable laser implemented with a tunable PIC. Other functions such as wavemeter passive components, laser clean-up filters, and wavelength and amplitude calibration functions can also be integrated on the same PIC Photodetector with large area and intrinsic gain, enabling photon counting from UV to infrared to improve sensitivity.

High-throughput collection optics using a combination of off-the-shelf components and/or custom nano-structured devices (e.g., photonic crystals and meta-surfaces) with enhanced collection efficiency Fixed Band-edge filter for laser spontaneous emission rejection and pump-Raman signal separation

Related U.S. Application Data

(60) Provisional application No. 62/610,059, filed on Dec. 22, 2017.

(51) Int. Cl.

| | | |
|---|---|---|
| *G01J 3/10* | (2006.01) | |
| *G01J 3/28* | (2006.01) | |
| *G01J 3/18* | (2006.01) | |
| *G01N 21/65* | (2006.01) | |
| *G01J 1/42* | (2006.01) | |
| *G01J 3/433* | (2006.01) | |
| *G02B 6/293* | (2006.01) | |

(52) U.S. Cl.
CPC .............. *G01J 3/18* (2013.01); *G01J 3/2803* (2013.01); *G01J 3/433* (2013.01); *G01J 3/44* (2013.01); *G01N 21/65* (2013.01); *G01J 2003/4334* (2013.01); *G01N 2201/0635* (2013.01); *G01N 2201/0638* (2013.01); *G01N 2201/06113* (2013.01); *G02B 6/29343* (2013.01); *G02B 6/29395* (2013.01)

(56) References Cited

U.S. PATENT DOCUMENTS

| | | | |
|---|---|---|---|
| 5,754,289 A * | 5/1998 | Ozaki ................... | G01N 21/65 250/339.12 |
| 6,763,047 B2 | 7/2004 | Daiber et al. | |
| 7,564,548 B2 | 7/2009 | Flanders et al. | |
| 8,873,041 B1 | 10/2014 | Chai et al. | |
| 10,656,012 B2 | 5/2020 | Atabaki et al. | |
| 2004/0257566 A1* | 12/2004 | Chism, II ............... | B82Y 20/00 356/369 |
| 2005/0007583 A1 | 1/2005 | DiFoggio | |
| 2007/0195320 A1 | 8/2007 | Sriram et al. | |
| 2008/0030726 A1 | 2/2008 | Flanders et al. | |
| 2012/0203114 A1 | 8/2012 | Bechtel et al. | |
| 2012/0309080 A1 | 12/2012 | Cunningham et al. | |
| 2017/0059412 A1 | 3/2017 | Ye et al. | |
| 2017/0062636 A1 | 3/2017 | Ram et al. | |
| 2017/0108439 A1 | 4/2017 | Stievater et al. | |
| 2017/0365726 A1 | 12/2017 | Meade et al. | |

OTHER PUBLICATIONS

Buet et al., "High angular tolerance and reflectivity with narrow bandwidth cavity-resonator-integrated guided-mode resonance filter." Optics Express 20.8 (2012): 9322-9327.

Cheng et al., "Vibrational spectroscopic imaging of living systems: An emerging platform for biology and medicine." Science 350.6264 (2015): aaa8870. 11 pages.

Han et al., "Non-paraxial Talbot Effect for Building Compact Spectrometers." Computational Optical Sensing and Imaging. Optical Society of America, 2016. 4 pages.

Haynes et al., "Surface-enhanced Raman spectroscopy." Analytical Chemistry 2005: 338-A. DOI: 10.1021/ac053456d. 9 pages.

Hulme et al., "Widely tunable Vernier ring laser on hybrid silicon." Optics Express 21.17 (2013): 19718-19722.

International Search Report and Written Opinion in International Patent Application No. PCT/US18/67042 dated Apr. 1, 2019, 18 pages.

Jermyn et al., "Intraoperative brain cancer detection with Raman spectroscopy in humans." Science Translational Medicine 7.274 (2015): 274ra19-274ra19. 11 pages.

Kong et al., "Raman spectroscopy for medical diagnostics—From in-vitro biofluid assays to in-vivo cancer detection." Advanced Drug Delivery Reviews 89 (2015): 121-134.

Lee et al., "High power and widely tunable Si hybrid external-cavity laser for power efficient Si photonics WDM links." Optics Express 22.7 (2014): 7678-7685.

Lewis et al., "Tunable laser resonance Raman spectroscopy of bacteriorhodopsin." Proceedings of the National Academy of Sciences 71.11 (1974): 4462-4466.

Lewis et al., "Tunable laser resonance Raman spectroscopy of the visual process. I: The spectrum of rhodopsin." Journal of Raman Spectroscopy 1.5 (1973): 465-470.

Li et al., "100Gb/s CWDM transmitter and receiver chips on a monolithic Si-photonics platform." Group IV Photonics (GFP), 2016 IEEE 13th International Conference on. IEEE, 2016. 2 pages.

Marchena et al., "Integrated tunable CMOS laser for Si photonics." Optical Fiber Communication Conference. Optical Society of America, 2013. 3 pages.

Pence et al., "Clinical instrumentation and applications of Raman spectroscopy." Chemical Society Reviews 45.7 (2016): 1958-1979.

Phelan et al., "Simultaneous multispecies gas sensing by use of a sampled grating distributed Bragg reflector and modulated grating Y laser diode." Applied Optics 44.27 (2005): 5824-5831.

Srinivasan et al., "Coupled-ring-resonator-mirror-based heterogeneous III-V silicon tunable laser." IEEE Photonics Journal 7.3 (2015): 1-8.

Sun et al., "Adaptive compressive spectrum sensing for wideband cognitive radios." IEEE Communications Letters 16.11 (2012): 1812-1815.

Ye et al. "Miniature, sub-nanometer resolution Talbot spectrometer." Optics letters 41.11 (2016): 2434-2437.

\* cited by examiner

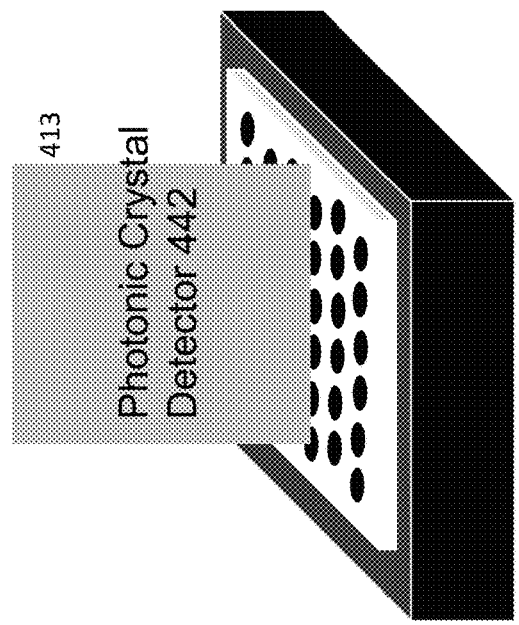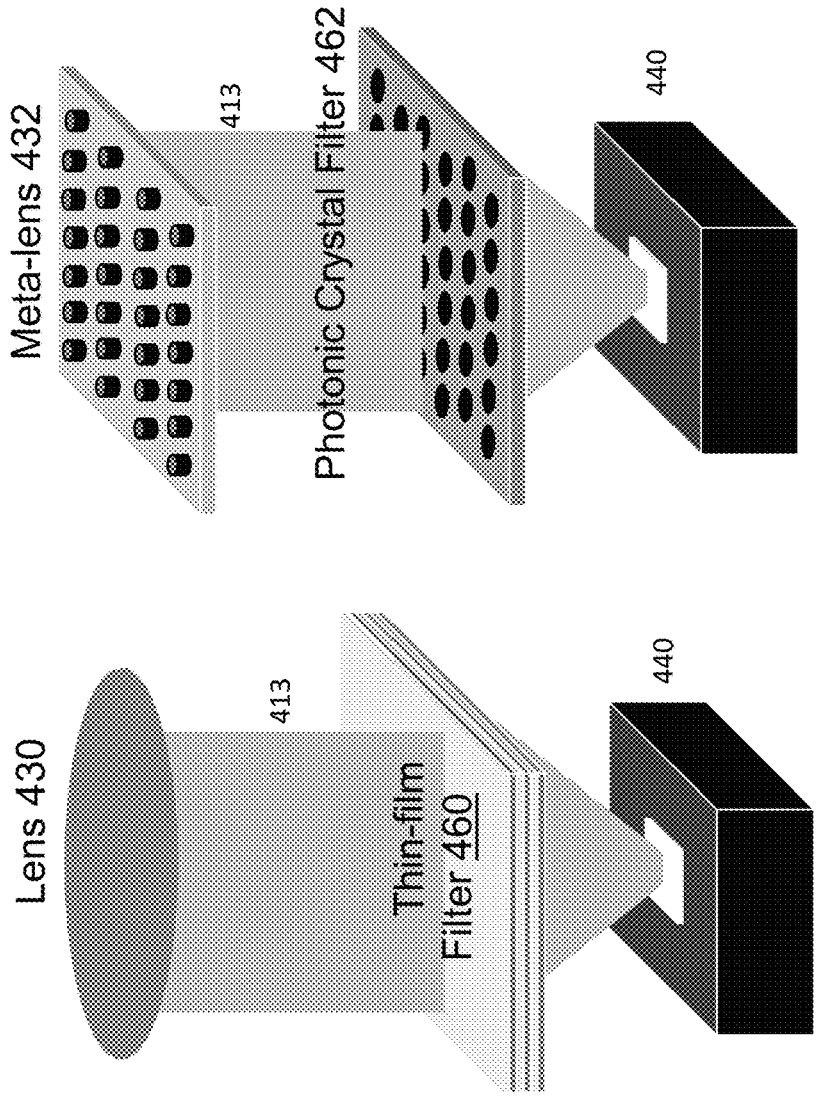
FIG. 4C
FIG. 4B
FIG. 4A

SWEPT-SOURCE RAMAN SPECTROSCOPY SYSTEMS AND METHODS

CROSS-REFERENCE TO RELATED APPLICATION(S)

This application is a continuation of U.S. application Ser. No. 16/229,355, filed on Dec. 21, 2018, and entitled "Swept-Source Raman Spectroscopy Systems and Methods," issued as U.S. Pat. No. 10,656,012 on May 19, 2020, which claims the priority benefit, under 35 U.S.C. § 119(e), of U.S. Application No. 62/610,059, filed on Dec. 22, 2017, and entitled "Swept Source Raman Spectroscopy Systems and Methods." Each of these documents is incorporated herein by reference in its entirety.

BACKGROUND

Raman spectroscopy is a technique used to gain information about the chemical composition of a material and the state of that material. In this technique, the sample is illuminated with a bright light source and the wavelength distribution of the scattered light is measured. 'Fingerprint' chemical spectra are acquired when a laser excites different molecular vibrations. These molecular vibrations extract some energy from the excitation light resulting in scattered light with a longer wavelength. While information rich, this scattered light, which is the Raman signal, is very weak as only one out of about a billion laser photons excite molecular vibrations.

A conventional Raman system uses a spectrometer to determine the distribution of the scattered light. Because these spectrometers typically disperse colors of light in different directions and rely on free space propagation for their spectral separation and detection, they exhibit tradeoffs between spectral resolution, sensitivity, and device size. For example, one way of improving the detection sensitivity of a Raman signal involves increasing the size of the input slit to allow for more light to enter the system, which would in turn require a longer optical path-length for adequately separating dispersed colors without the loss of spectral resolution. This leads to a larger device and a detector array (e.g., a charge-coupled device (CCD)), increasing the cost and size of the Raman system. To get the highest performance, these detectors must also be cooled with thermoelectric refrigerators or liquid nitrogen, further increasing the cost and size of these systems.

The tradeoff among the size, cost, and sensitivity of Raman analyzers has resulted in two different instrument categories: (1) lower cost, handheld Raman analyzers with low sensitivity and (2) more expensive bench-top Raman analyzers with high sensitivity capable of measuring smaller concentrations of materials. (Here, sensitivity is defined as the rate of change in the output of the device/sensor to the rate of change of concentration. A device with a higher sensitivity can detect a weaker signal (lower analyte concentration) than a device with a lower sensitivity.) Handheld Raman analyzers are used mostly for identifying chemicals in high concentrations, for example, for explosives and illicit drugs. Bench-top Raman systems are used mainly for process monitoring in the pharmaceutical industry and as research tools in chemistry and life sciences laboratories. The sensitivity of these expensive bench-top systems is still much worse (orders of magnitude lower) than many other analytical techniques, such as mass spectroscopy.

Improving the sensitivity of Raman analyzers would unlock the benefits of Raman analysis in a whole host of new applications, including monitoring of low-concentration biochemical in pharmaceutical bioreactors, detection of highly potent street drugs especially synthetic opioids, monitoring of water and air contaminants, and monitoring of human physiology. Many of these applications require sensitivity levels that are outside the reach of today's Raman analyzers, so they are currently performed with more expensive, lower-throughput techniques, such as mass spectroscopy or chemical/enzyme-based assays.

There is also a desire or need to mitigate the performance tradeoffs of today's Raman analyzers. A more compact, cheaper Raman system that uses a lower power laser and lower cost detector would open up possibilities for using Raman spectroscopy in a wider range of settings, including the Internet of Things (IoT), as a clinical tool, and as an affordable consumer device.

SUMMARY

Rather than using a spectrometer for Raman spectroscopy, we have recognized that it is possible to use a fixed optical filter coupled with a detector to collect and detect Raman light at a single color. The Raman spectrum can then be obtained sequentially by sweeping the frequency of the excitation source, and therefore, the frequency offset between the excitation and fixed Raman collection band (or the Raman shift). This technique is called swept source Raman (SSR) spectroscopy. By virtue of collecting the signal from a single wavelength, swept source Raman spectroscopy does not have the spectrometer sensitivity, spectral resolution, and size tradeoffs of conventional Raman spectroscopy system. The system resolution is determined by the bandwidth of the narrowband collection filter and the frequency resolution of the swept source. And the system can be much smaller than a spectrometer-based Raman spectroscopy system because it does not rely on free space propagation for spectral separation. The sensitivity of this system can be orders of magnitude more sensitive than that of a spectrometer-based Raman analyzer similar to its size. And the system sensitivity can be improved with larger collection optics, while the rest of the system dimensions are kept fixed—similar to using high-numerical aperture (NA) or fast lenses in photography.

Our swept source Raman (SSR) spectroscopy system may include a tunable laser built with an external cavity photonic integrated circuit (PIC) chip for excitation; a wavemeter for absolute wavelength measurement during wavelength tuning; and a detection system with a bandpass filter, collection optics, and detector for selecting and detecting the wavelength band/bands of interest. It can also include a laser clean-up filter for rejecting amplified spontaneous emission. This laser clean-up filter can be an optical short-pass edge filter allowing for measurement of a Stokes Raman signal or a long-pass filter for an anti-Stokes Raman measurement. It could also be a notch filter or bandpass filter.

Any or all of these components may be integrated onto the PIC chip, as can wavelength, wavelength shift, and amplitude calibration components. For instance, one or more of the wavemeter's components (e.g., gratings, interferometers, resonators) can be implemented on the PIC chip, as can the laser cleanup filter (shortpass, longpass, notch, bandpass) and the excitation and collection optics, including lenses and phased arrays. The wavemeter can also be implemented on the PIC chip or may include discrete (non-integrated) components that are mated or coupled to the PIC chip. If the wavemeter is a Talbot wavemeter, for example, it may include an on-chip diffractive component (e.g., a grating) that disperses the light out of the PIC chip to undergo diffraction in free space before detection by an off-chip detector.

The SSR spectroscopy system may include multiple detectors coupled to separate wavelength filters to increase the range of measured Raman shifts for a given range of source wavelength sweep. If desired, photonic crystal (PhC) out-of-plane filters may enhance light collection efficiency through a wider illumination acceptance cone-angle for each detector. The SSR spectroscopy system may also include a high-NA, narrowband meta-lens for enhancing light collection efficiency. In either of these cases, the detector can be narrowband through in-plane resonance with out-of-plane coupling using the photonic crystals, meta-surfaces, or another nanostructure.

In operation, the tunable laser's output wavelength may be tuned with a controller executing an adaptive algorithm for reducing or minimizing the Raman spectrum acquisition time. High-resolution tuning of the tunable laser's output wavelength can improve the spectral resolution. Deconvolving the system spectral response from the acquired spectrum with a processor coupled to the detector can also make the spectral resolution finer.

Another example SSR system may include a tunable laser, a wavelength sensor in optical communication with the tunable laser, a spectrally selective detector, and a processor operably coupled to the wavelength sensor and the spectrally selective detector. In operation, the tunable laser emits a tunable excitation beam, and the wavelength sensor measures an absolute wavelength of the tunable excitation beam. The spectrally selective detector detects a Raman signal emitted by a sample in response to excitation with the tunable excitation beam. And the processor determines a Raman spectrum of the sample based on the Raman signal and the absolute wavelength of the tunable excitation beam. The tunable laser, the wavemeter, and/or the spectrally selective detector can be integrated in a photonic integrated circuit.

The SSR system may also include a band-edge filter, in optical communication with the tunable laser, to reject at least a portion of amplified spontaneous emission from the tunable laser.

The spectrally selective detector can have an active area larger than 50 μm by 50 μm. It can also include filter to transmit a first portion of the Raman signal and to reject at least a second portion of the Raman signal and a photodetector to detect the first portion of the Raman signal. In this case, the SSR system may also include a first lens, in optical communication with the sample, to collect the Raman signal and a second lens, in optical communication with the first lens and the photodetector, to focus the first portion of the Raman signal on the spectrally selective detector. The first lens may be arranged to fill an acceptance cone-angle of the spectrally selective filter with the Raman signal. And a distance between the first lens and the second less can be less than or equal to about 150 mm.

An inventive method may include exciting a sample with a wavelength-swept excitation beam; detecting a Raman signal emitted by the sample in response to excitation with the wavelength-swept excitation beam; measuring an absolute wavelength of the wavelength-swept excitation beam; and determining a Raman spectrum of the sample based on the Raman signal and the absolute wavelength of the wavelength-swept excitation beam. This method may also include filtering light at a wavelength of the wavelength-swept excitation beam from the Raman signal.

Another SSR spectroscopy system includes a tunable laser, a first filter in optical communication with the tunable laser, a first lens in optical communication with the first filter, a second filter in optical communication with the first lens, a second lens in optical communication with the second filter, a detector in a focal plane of the second lens, a wavemeter in optical communication with the tunable laser, and a processor operably coupled to the detector and the wavemeter. In operation, the tunable laser emits a nonlinearly swept laser beam. The first filter rejects amplified spontaneous emission (ASE) noise emitted by the tunable laser and passes the nonlinearly swept laser beam. The first lens, which has a numerical aperture of at least 0.5, focuses the nonlinearly swept laser beam to a point within a sample and collects Raman light emitted by the sample in response to the nonlinearly swept laser beam. The second filter filters the Raman light with an extinction ratio of at least 60 dB. The second lens, which has an etendue equal to or greater than an etendue of the first lens, focuses the Raman light. The detector, which can have an active area whose width is at least 50 micrometers, detects the Raman light. The wavemeter measures an absolute wavelength of the nonlinearly swept laser beam as a function of time. And the processor estimates a Raman spectrum of the sample based at least in part on the Raman light and the absolute wavelength of the nonlinearly swept laser beam as a function of time.

The tunable laser may experience at least one mode hop while emitting the non-linearly swept laser beam and/or sweep the nonlinearly swept laser beam non-continuously in wavelength.

The wavemeter may include a lens, a grating, and a detector array. In operation, the lens generates a substantially collimated beam from the incident radiation. The grating diffracts the substantially collimated beam so as to form a plurality of Talbot images at intervals along a direction perpendicular to the grating. And the detector array, which is disposed at an angle with respect to the grating, detects at least a portion of the plurality of Talbot images.

The detector may detect a spatial distribution of the Raman light on the detector.

The tunable laser, the first filter, and/or the wavemeter can be integrated on a substrate.

A method of measuring a Raman spectrum of a sample includes emitting a non-linearly swept laser beam from a tunable laser; filtering amplified spontaneous emission (ASE) noise from the nonlinearly swept laser beam; focusing the nonlinearly swept laser beam to a point within a sample; collecting Raman light emitted by the sample in response to the non-linearly swept laser beam with a first lens having a numerical aperture of at least 0.5; filtering the Raman light with an extinction ratio of at least 60 dB; detecting the Raman light with a detector having a lateral dimension of at least 1 millimeter; measuring an absolute wavelength of the non-linearly swept laser beam as a function of time while focusing the nonlinearly swept laser beam to a point within a sample; and estimating the Raman spectrum of the sample based at least in part on the Raman light and the absolute wavelength of the nonlinearly swept laser beam as a function of time.

Emitting the nonlinearly swept laser beam may include making at least one mode hop with the tunable laser. It may also include sweeping the nonlinearly swept laser beam non-continuously in wavelength.

Filtering the Raman light may include transmitting the Raman light through a filter having a transmission that varies in wavelength as a function of incidence angle, in which case detecting the Raman light may comprise detecting a spatial distribution of the Raman light, the spatial distribution mapping to the transmission of the filter. The Raman spectrum can then be estimated based on the spatial distribution of the Raman light.

Measuring the absolute wavelength of the nonlinearly swept laser beam as a function of time may include transmitting incident radiation through a grating to generate a plurality of Talbot images; detecting the Talbot images with a detector array tilted with respect to the grating; and estimating the wavelength based at least in part on the plurality of Talbot images.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4A shows high-throughput optics, including a bulk lens and a thin-film filter, for collecting and detecting light in an SSR spectroscopy system.

FIG. 4B shows high-throughput optics, including a metalens and a photonic crystal filter, for collecting and detecting light in an SSR spectroscopy system.

FIG. 4C shows a photonic crystal detector for collecting and detecting light in an SSR spectroscopy system.

DETAILED DESCRIPTION

Figure 1:
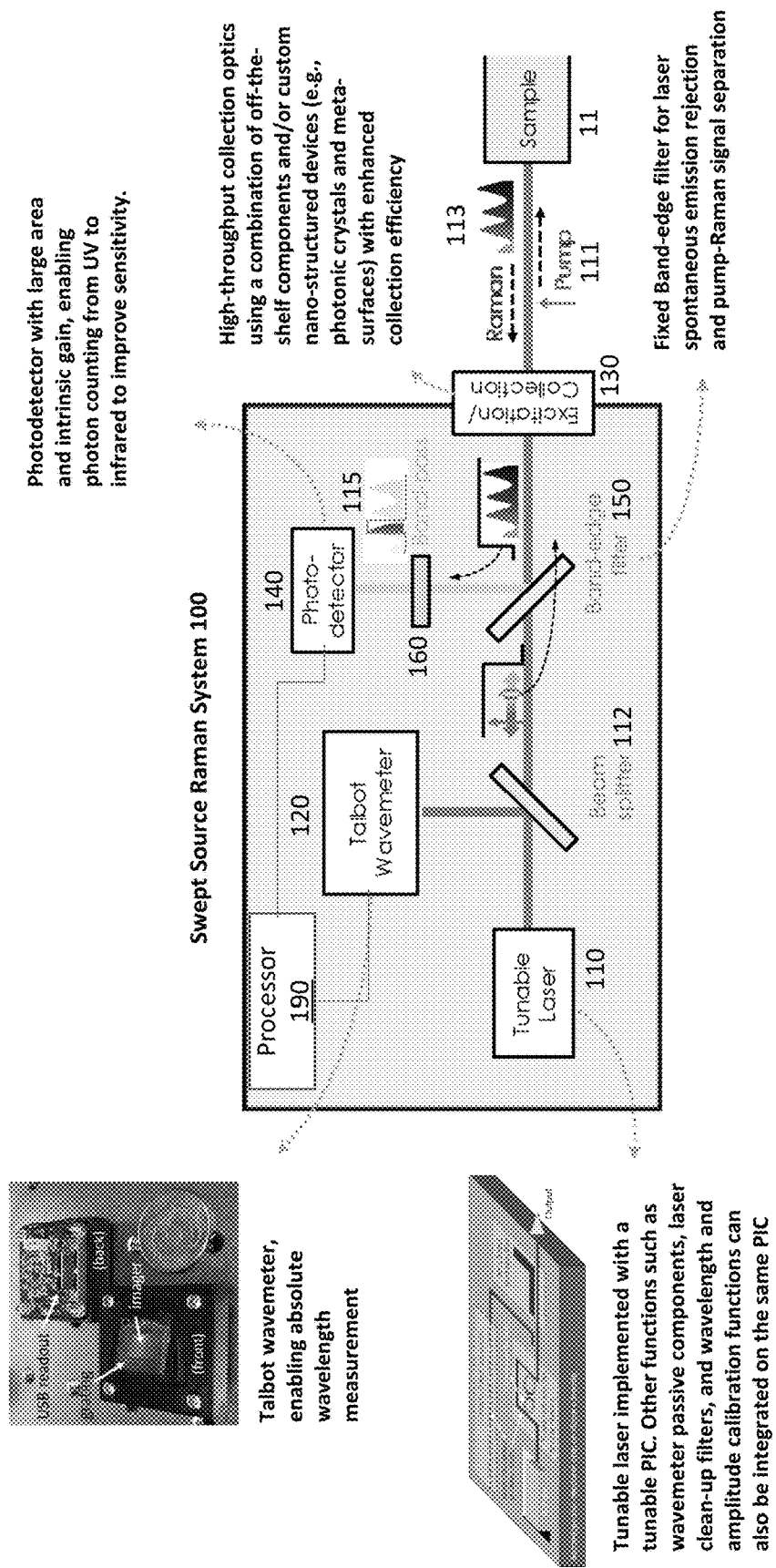
FIG. 1 is a block diagram of a swept source Raman (SSR) spectroscopy system with a tunable laser, Talbot wavemeter, band-edge filter, and narrowband detector.

Our approach uses integrated tunable lasers and compact wavemeters to replace the spectrometers and detector arrays used in existing Raman systems. We leverage the revolution in integrated photonics and CMOS imaging systems to tune the laser's wavelength and use a single large-aperture, high-sensitivity detector or detector array to gather a larger fraction of the Raman light. While tunable lasers have been used since the 1970's for swept-source Raman spectroscopy, no practical Raman analyzer has been developed using this technique. This could be due to the size, cost, and complexity of tunable lasers that have enough tuning range and optical power for building useful Raman spectroscopy instruments. Another reason could be a widely held belief that tunable excitation lasers will also require tunable 'clean-up' filters, which can be as complex and expensive as the tunable laser systems themselves.

Our swept-source Raman (SSR) spectroscopy system can include: (1) a tunable photonic integrated circuit (PIC) for the integration of system functions prior to sample illumination on a chip, including a tunable reflector for an external cavity swept source; (2) a wavemeter for absolute wavelength measurement during Raman spectrum acquisition; (3) adaptive wavelength tuning for efficient extraction of the Raman spectrum; (4) high throughput light-collection optics optimized for single-wavelength detection; and (5) a large-area detector for sensitive photon detection. The system may also include a second laser source for stimulation of the Raman signal (aka stimulated Raman scattering).

The system's tunable laser can be used with a single fixed-edge filter, also called a band-edge filter. The band-edge filter is aligned to the shortest Raman shift and works as a clean-up filter for any wavelength that the laser is tuned to. This dramatically simplifies the overall system by eliminating the need for a spectrometer or notch filter in the excitation beam path.

As SSR spectroscopy can work with a single large-area detector or detector array, the entire spectrometer can be replaced with a single large (e.g., 1-5 mm diameter) aperture detector that can have 100 to 1000 times the light gathering power of today's portable Raman systems and 1 to 10 times the light gathering power of today's laboratory, bench-top Raman systems. Enhanced light collection for spontaneous Raman scattering directly results in improved sensitivity.

In conventional dispersive spectrometers, there is a trade-off between spectral resolution, size, and sensitivity. In an inventive SSR spectrometer, the detector can have improved spectral resolution simultaneously with reduced size. It can be a single large area detector, such as a high-performance Single Photon Avalanche Detector (SPAD) with a high dynamic range and single-photon sensitivity even at room temperature. This SPAD can operate without cooling and still have better dark count rates than a thermoelectrically cooled charge-coupled device (CCD).

A Swept Source Raman (SSR) Spectroscopy System

FIG. 1 shows an example of our swept source Raman (SSR) spectroscopy system 100. The SSR spectroscopy system 100 includes a tunable laser 110, high-throughput collection optics 130, a band-edge filter 150, and a bandpass filter 160 in front of a large-area detector 140, such as a photon-counting amplified detector, CCD, or CMOS array. The system 100 also includes a beam splitter 112 that couples the tunable laser 110 to a wavelength sensor, such as a spectrometer or, here, a Talbot wavemeter 120. The tunable laser 110 can be implemented in a photonic integrated circuit (PIC) along with the wavemeter's passive components, the beam splitter 112, the band-edge filter 150, and electronics for calibrating the wavelength and amplitude of the tunable laser's output. The collection optics 130 can include off-the-shelf components, such as bulk lenses, and/or custom nano-structured devices, such as photonic crystals and meta-surfaces, with enhanced collection efficiency.

In operation, the tunable laser 110 emits a swept or chirped pump or excitation beam 111, which may be discontinuous (e.g., due to mode hops) and/or nonlinear. The tunable laser 110 may sweep the pump beam's wavelength over a tuning range of 850 nm to 1200 nm during a period of 1 second to 100 seconds (e.g., about 10, 20, 30, 40, or 50 seconds). Shorter, faster wavelength tuning is also possible; for instance, the tunable laser 110 may sweep the pump beam 111 over a range of 35-50 nm in milliseconds to seconds.

The pump beam 111 propagates through the beam splitter 112 and the band-edge filter 150, which rejects amplified spontaneous emission (ASE) light from the tunable laser 110. The collection optics 130 focus the filtered pump beam 111 onto a sample 21, which responds to the pump beam 111 by emitting Raman light 113 isotropically. The collection optics 130 collect and collimate a portion of the Raman light 113. This collimated Raman light reflects off the band-edge filter 150 and propagates through the bandpass filter 160, which reflects and/or attenuates light at the wavelength of the pump beam 111. The passband of the bandpass filter 160 should overlap with the stopband of the band-edge filter 150, which should have a passband that overlaps with the tuning range of the tunable laser 110.

The photodetector 140 senses the portion of the Raman light 113 transmitted by the bandpass filter 150. The photodetector 140 has a large area (e.g., an area of at least 50 µm×50 µm) and intrinsic gain, it can count photons from the ultraviolet (UV) to the infrared (IR) regions of the electromagnetic spectrum to improve the system's sensitivity. Generally, the photodetector 140 and bandpass filter 160 should allow for detection of a Raman shift of 200-4000 $cm^{-1}$ (e.g., 200-1800 $cm^{-1}$ or 3000-3500 $cm^{-1}$).

The Talbot wavemeter 120 measures the (absolute) wavelength and power of the pump beam 111 while the photodetector 140 detects the filtered Raman light 113. A processor 190 coupled to the Talbot wavemeter 120 and the photodetector 140 determines the sample's Raman spectrum 115 from the detected Raman signal and the wavelength and power measurements made by the Talbot wavemeter 120. In short, the processor maps each Raman signal measurement made by the photodetector 140 to the corresponding wavelength and power measurement made by the Talbot wavemeter 120. This accounts for wavelength discontinuities and other nonlinearities, if any, in the wavelength sweep of the tunable laser 110.

The SSR spectrometer 100 can be built with optical filters other than a narrow-band bandpass filter 160. The narrow-band bandpass filter 160 simplifies the estimation of Raman spectrum because the tunable spectrometer 100 collects Raman signal at only one color or wavelength channel at a time. It is also possible to use a filter with another type of spectrally selective filer, such as a long-pass filter, a band-edge filter, or a multi-peak filter. Any spectrally selective filter should work, so long as the SSR spectrometer's transfer function can be inverted to estimate the Raman spectrum from the time series data representing the integrated optical power passed through the filter. (The time series data is collected as the laser is tuned across its tuning range.)

For example, a long-pass filter can be used instead of the bandpass filter 160. In this case, the SSR spectrometer detects the sum (or integral) of all colors beyond the cutoff wavelength of the filter. As the tunable laser's output 111 is tuned towards shorter wavelengths, less of the Raman light 113 passes through the filter, causing the integrated detected power to decrease. By taking the derivative of the time-series data collect by the SSR spectrometer, the processor 190 can recover the spectrum of the Raman light 113.

The SSR spectroscopy system 100 in FIG. 1 has several advantages over previous Raman spectrometers. For example, it does not need moving parts, such as a rotating grating or stretchable fiber Bragg grating for an external cavity tunable source, because it can use a tunable source integrated onto a PIC along with a wavelength measurement system, wavelength and amplitude calibration components, and illumination optics. In addition, because it uses a wavemeter for absolute wavelength measurement, it can operate with non-continuous and nonlinear wavelength sweeps, unlike a typical conventional Raman spectrometer, which requires a continuous (linear) wavelength sweep. The need for a continuous wavelength sweep limits the wavelength tuning schemes and can increase signal acquisition time. Conversely, an inventive SSR spectrometer can use more sophisticated signal processing and adaptive tuning to reduce acquisition time, distinguish closely located Raman peaks, and perform deconvolution to improve spectral resolution. In addition, an inventive SSR spectrometer uses narrow-band collection and detection optics to increase collection efficiency and signal-to-noise ratio (SNR) compared to conventional lenses and filters.

A Compact SSR Spectrometer with a Photonic Integrated Circuit (PIC)

Figure 2A:
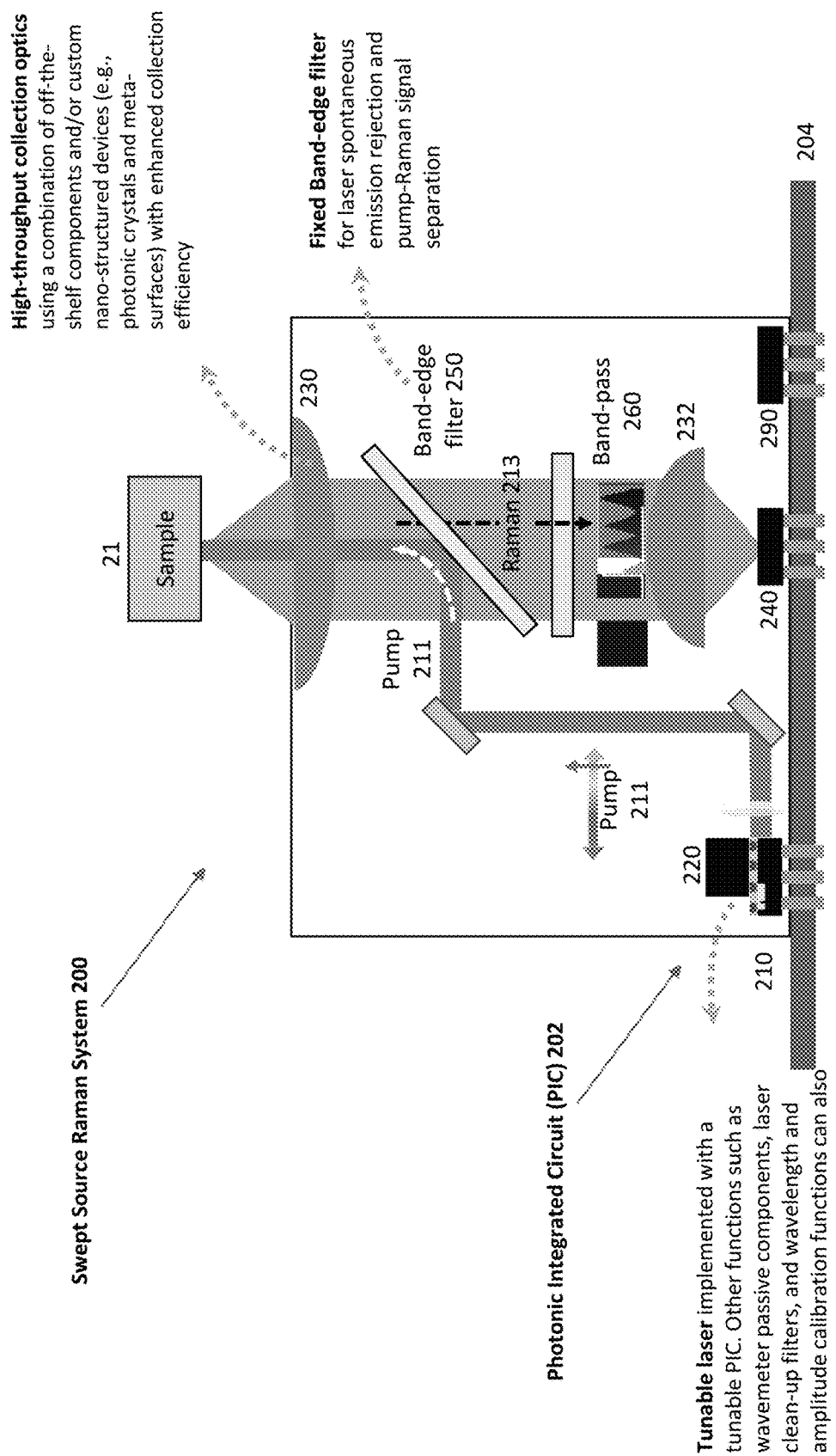
FIG. 2A is a schematic diagram of an SSR spectroscopy system with parts of the laser and wavemeter integrated onto a photonic integrated circuit (PIC).

FIG. 2A illustrates a compact SSR spectrometer 200 with a tunable laser 210 and Talbot wavemeter 220 packaged together in a PIC 202. The PIC 202 is mounted to a substrate 204, such as a printed circuit board, as is a large-area detector 240 and a processor 290. The compact SSR spectrometer 200 also includes a reflective band-edge filter 250 that doubles as a spectrally selective beam splitter and is between the tunable laser 210 and a first (collection) lens 230. The band-edge filter 250 "cleans up" a pump beam 211 emitted by the tunable laser 210 by reflecting light above or below a given wavelength (e.g., 870 nm) toward the first lens 230 and attenuating or transmitting light at other wavelengths.

The first lens 230 can be a bulk optical lens (e.g., a singlet or asphere), a photonic crystal lens, or meta-surface and can have a numerical aperture (NA) of 0.5, 0.6, or higher. It focuses the pump beam 211 to a point on or within a sample 21. The sample 21 responds to this excitation by emitting a Raman signal 213. The first lens 230 collects and collimates a portion of this Raman signal 213, which propagates through the band-edge filter 250 and through a band-pass filter 260, which transmits light in a band including the Raman signal wavelength and rejects light at other wavelengths. Together, the band-edge filter 250 and band-pass filter 260 provide isolation of 50 dB, 55 dB, 60dB, or more.

A second lens 232 focuses the filtered Raman signal 213 onto a large-array detector 240, which may be a photodiode (with or without an amplifier), SPAD, CCD, or CMOS array with an (aggregate) active area whose dimensions are at least 50 µm×50 µm. Larger sizes are also possible; for instance, the detector's length may be 100 µm, 500 µm, 1 mm, or more.

Figure 2B:
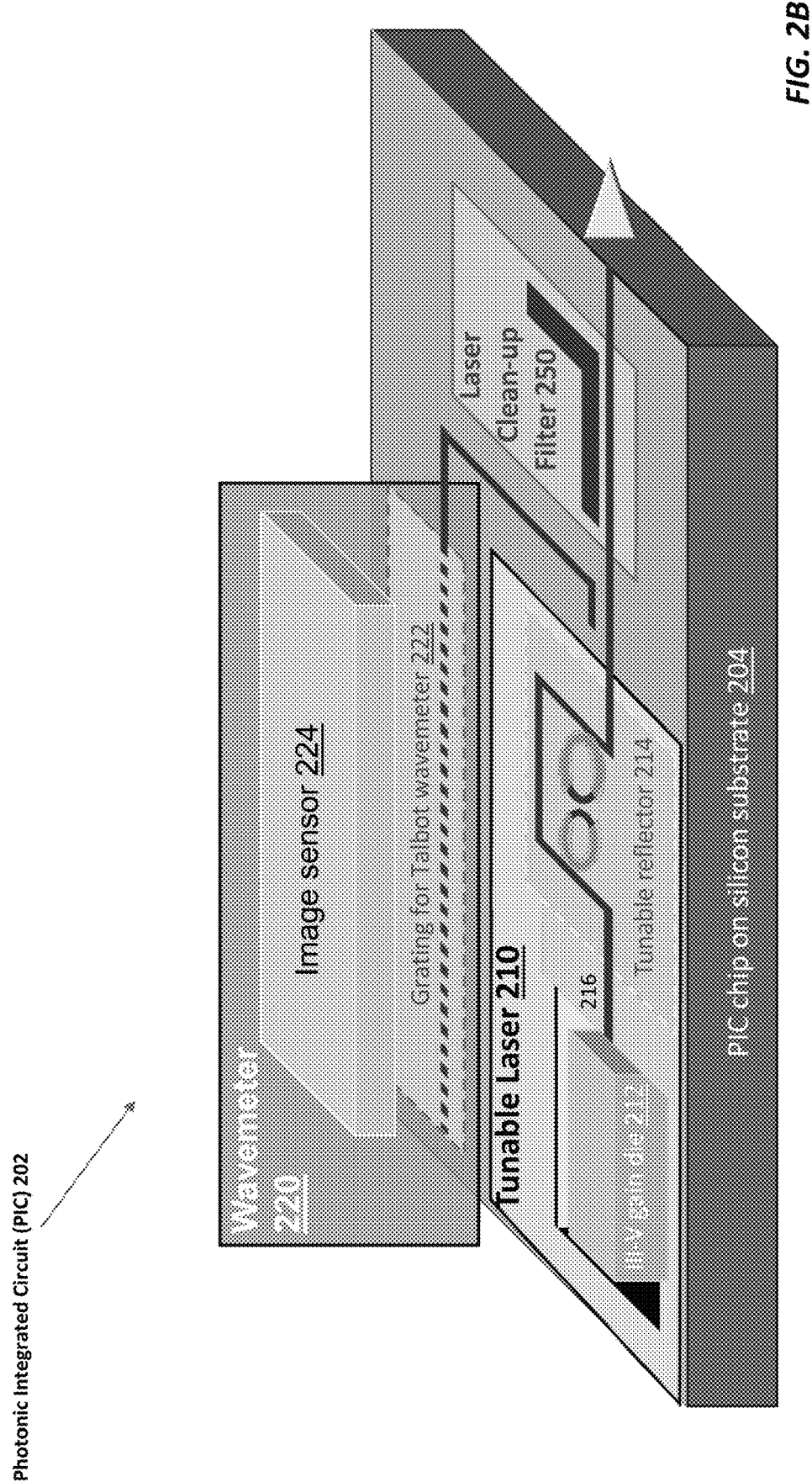
FIG. 2B is a schematic diagram of the PIC used in the SSR spectroscopy system of FIG. 2A.

FIG. 2B shows the PIC 202 of FIG. 2A in greater detail. The PIC 202 integrates the excitation laser source 210 along with the wavemeter 220 for wavelength and power monitoring and calibration. This leverages the fact that in SSR spectroscopy the spectral span is swept on the excitation end, using a temporally coherent monochromatic light source (the tunable laser 210) that lends itself well to device integration and guided-wave photonic circuits. Virtually all functions prior to sample illumination/excitation can be integrated on this PIC 202: a tunable reflector 214 and the optical path-length of the external cavity for the swept source 210, passive and active elements of the wavemeter 220 (e.g., a diffraction grating 222), absolute wavelength and amplitude calibration components, and even the filter 250 for rejecting ASE at the detection wavelength or wavelengths and parts of the illumination optics (e.g., vertical grating coupler, phased array element). The PIC 202 simplifies device packaging considerably through integration and makes the SSR spectrometer 200 more compact and less expensive.

FIG. 2B shows that the tunable laser 210 is an external-cavity laser with an edge-emitting III-V gain chip 212 that is side-coupled to a waveguide 216 on the PIC's substrate 204. This laser 210 also includes an integrated photonic tunable reflector 214 on the PIC 202 that acts as an output coupler. Tuning the tunable reflector 214 changes the laser's output wavelength.

Figure 2C:
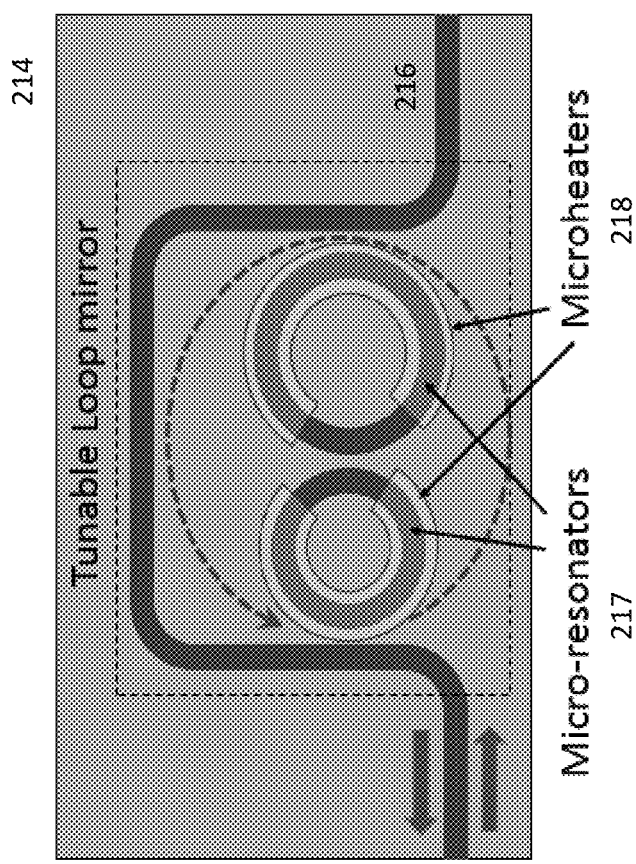
FIG. 2C shows a tunable loop mirror used in the PIC shown in FIG. 2B.

FIG. 2C shows the tunable mirror 214 in greater detail. The tunable mirror 214 uses a coupled micro-resonator design employing the Vernier effect. This mirror uses an integrated loop mirror design with a tunable coupler for closing the loop. The tunable coupler exploits the Vernier effect with two coupled micro-resonators 217 with different sizes. Micro-heaters 218 heat the micro-resonators 217 to vary. This increases the tunable reflector's free spectral range and allows narrowband reflection as small as 0.01 nm over a wide tuning span (e.g., about 100 nm).

Figure 2D:
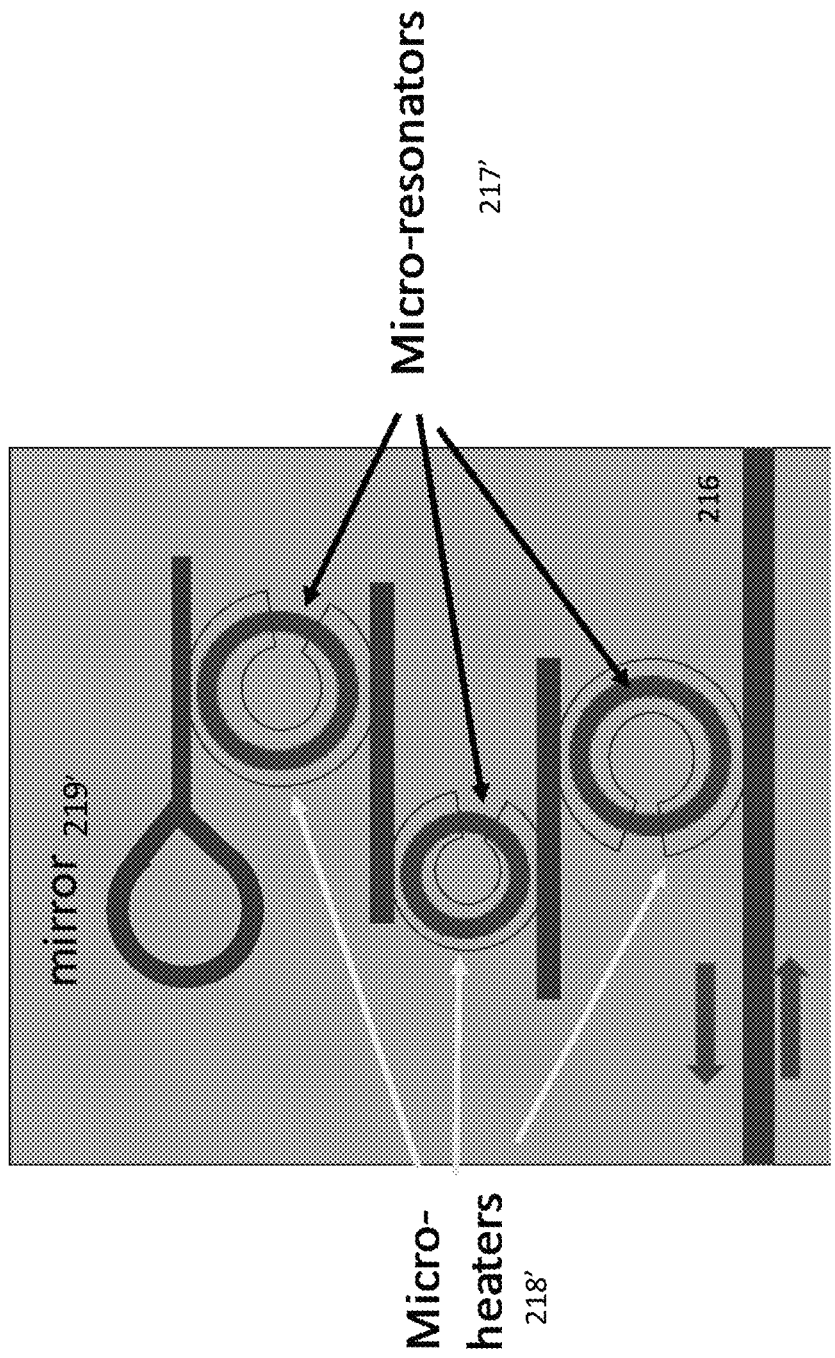
FIG. 2D shows an alternative tunable output coupler for use in the PIC shown in FIG. 2B.

FIG. 2D shows an alternative tunable output coupler 214' suitable for use in the tunable laser 210 of FIGS. 2A and 2B, e.g., instead of the tunable mirror 214 of FIG. 2C. It functions a tunable mirror that transmits some pump light and reflects the rest of the pump light back into the laser cavity as indicated by the arrows at lower left. This tunable output coupler 214' includes three micro-resonators 217' that are evanescently coupled to different sections of waveguide 216 and to a waveguide loop mirror 219. Micro-heaters 216' control the resonance frequencies of the micro-resonators 217'. Heating or cooling the micro-resonators 217' with the micro-heaters 216' shifts the micro-resonators' resonance frequencies, changing the output wavelength of the tunable output coupler 214'.

Referring again to FIG. 2B, the waveguide 216 guides most of the pump beam 211 transmitted by the tunable reflector 214 to the laser clean-up filter 250, which may also be integrated into the PIC 202. This filter 250 rejects ASE in the passband of the bandpass filter 260 that filters the Raman signal 213. It can be a fixed band-edge (short-pass or long-pass for Stokes or Anti-Stokes Raman spectroscopy, respectively) or stop-band (aka notch) filter. This eliminates the need for an off-chip ASE rejection filter.

The waveguide 216 also guides some of the pump beam to the wavemeter 220, which includes a grating 222 formed in or on the substrate 204 and an image sensor 224 fixed (e.g., in a tilted position) above the grating 222, for absolute wavelength and power measurement. The period of the grating 222 is comparable to the wavelength of interest, so the grating acts outside the paraxial limit. Since there is great design flexibility for the diffraction grating 222 or any diffractive optical element on the chip (e.g., through patterning the waveguiding material) a variety of wavemeter designs based on the Talbot or different diffraction effects can be used, including those with non-uniform gratings.

In operation, the grating 222 forms periodic Talbot images, which the image sensor 224 samples simultaneously at various distances along a direction perpendicular to the grating. A processor (not shown) calculates the absolute wavelength of the incident beam by Fourier transforming the measured Talbot images or by comparing the measured Talbot images with a library of intensity patterns acquired with light sources having known wavelengths. For more information on the wavemeter, see, e.g., U.S. Pre-Grant Publication No. 2017/0059412 A1, which is incorporated herein by reference in its entirety.

Any system function prior to signal collection and detection can be integrated on the PIC 202. Light collection and detection can also be integrated on the same PIC 202, e.g., using meta-lenses, photonic crystal filters, integrated detectors, and/or other nanostructures to collect, filter, guide, and detect the weak Raman signal 213. Light collection and detection can also be implemented on a separate PIC or with discrete components as shown in FIG. 2A.

Detector for the Wavemeter in the PIC

The detector 224 in the wavemeter 220 can monitor optical power at several locations on the PIC 202 in addition to sensing diffracted light for wavelength measurements. The detector can be integrated on the chip with the rest of the waveguide components or can be an off-chip detector array, such as a multi-element detector array, CMOS image sensor, CCD, or focal-plane array. An off-chip detector system can be coupled to the PIC 202 through the edge of the PIC 202 or could be placed on top of the PIC 202, as shown in FIG. 2B, in which case the guided light on the chip needs to be radiated vertically towards the detector system using an on-chip component (e.g., a vertical grating coupler).

The detector 224 could also be integrated on the chip by adding an absorbing material to the chip. This material could be deposited, epitaxially grown, or wafer-bonded to the main PIC substrate 204. This material could be single-crystal silicon for UV, visible and near IR (NIR) wavelengths (200-1200 nm); poly-crystalline silicon for UV to IR wavelengths (200-2000 nm); germanium or silicon-germanium for UV to IR wavelengths (200-1600 nm); or a III-V compound semiconductor, such as InGaAs, for NIR to IR wavelengths (700-2000 nm).

Poly-crystalline silicon can be deposited on the substrate 204 at a very low cost and has adequate absorption from UV to IR wavelengths (200-2000 nm). Absorption at wavelengths below 1200 nm is through direct and indirect transitions; at longer wavelengths (e.g., 1200-2000 nm), absorption is through the mid-gap defect states of polysilicon. Poly-crystalline silicon can be deposited using plasma-enhanced chemical vapor deposition (PECVD) at either high temperatures (roughly 950 degrees C.) or at lower temperatures (roughly 500-600 degrees C.) and then annealed. The deposition and annealing conditions can be selected to increase or maximize the absorption and overall quantum efficiency of the detector elements that are made in the poly-crystalline silicon layer. The detector elements are formed by implementing PN or PIN junction photodiodes through appropriate ion-implantation and annealing to form the doping regions. On-chip light can either be coupled to these detectors abruptly (e.g., through butt-coupling) or gradually (e.g., through evanescent coupling).

PIC Fabrication and Materials

The PIC may include a single III-V substrate for the integration of a laser or array of lasers (for excitation of Raman emission) and/or a wavemeter, wavelength reference, amplified spontaneous emission filter, and optical components for illumination of the sample. It can also include multiple III-V substrates of different types for the integration of array of lasers at different wavelengths for excitation of Raman emission. Another possible PIC has a hybrid substrate system with a first III-V substrate with lasers and/or optical gain in optical communication with a second (e.g., non-III-V) substrate without optical gain. For example, the first III-V substrate may include an array of lasers and/or an array of gain media as parts of external-cavity lasers build in conjunction with a second substrate without optical gain.

The second substrate can include a heater material for tuning on-chip optical components; tunable mirror for implementing an external cavity laser with a gain medium on the first substrate; wavemeter or parts of a wavemeter; wavelength reference; amplified spontaneous emission filter; and/or on-chip optic components for illuminating the sample. It can also include a low-loss, thin-film material, such as silicon nitride, silicon oxynitride, aluminum oxide, titanium oxide, or silicon, for waveguiding or a thin-film material with optical absorption, such as silicon, poly-crystalline silicon, germanium, or silicon germanium, for on-chip optical detectors.

Light Collection and Detection in an SSR Spectroscopy System

Raman emission is spontaneous and therefore omnidirectional (isotropic). In addition, with most solid materials and turbid solutions, the excitation light scatters and diffuses, and therefore illuminates a wide area of the target up to a few millimeters in lateral extent even for a tightly focused beam. As a result, a sample may emit Raman light from a wide area with an etendue that could be as large as 500 mm$^2$, e.g., a 10 mm diameter patch emitting over a $2\pi$ steradian solid angle towards the SSR spectrometer.

An SSR spectroscopy system's entire optical chain should collect as much of this Raman light as possible for better sensitivity and higher signal-to-noise ratio performance. One measure of an SSR spectroscopy system's ability to collect Raman light is its etendue. From the perspective of the sample, the etendue is the product of the area of the sample and the solid angle subtended by the SSR spectroscopy system's entrance pupil as seen from the sample. Equivalently, from the perspective of the SSR spectroscopy system, the etendue is the area of the entrance pupil times the solid angle subtended by the sample as seen from the entrance pupil.

TABLE 1 shows the collection/detection etendue of traditional spectrometer-based Raman systems and inventive SSR spectroscopy systems. It shows that an inventive SSR spectroscopy system can achieve or exceed the etendue of bench-top spectrometer-based systems.

TABLE 1

Light Collection/Detection Efficiency

| Spectrometer Type | Etendue (mm$^2$) | Notes |
|---|---|---|
| SSR Spectrometer | 0.1-1.0 | Using 10-25 mm diameter optics (entrance pupil) |
| Portable Raman Spectrometer (ThermoFisher First Defender) | 0.001-0.005 | |
| Benchtop Raman Spectrometer (Horiba iHR320, Action SP3001) | 0.1-0.2 | |

Collecting the Raman emission at a single wavelength increases the collection efficiency compared to spectrometer-based Raman systems that collect broadband Raman light. Achieving high throughput, however, benefits from careful design of the whole optical chain, from the collection lens to the detector.

Etendue and Light Collection Optics

The etendue of the SSR spectrometer depends in part on the numerical aperture (NA) of the lens used to collimate Raman light emitted by the sample (e.g., the first lens 230 in FIG. 2A). This first lens should have as high an NA (e.g., 0.5, 0.6, or higher) as possible to collect as much Raman emission over as large a solid angle as possible. The first lens can be a high-NA singlet lens, aspherical lens, or a multi-element optic, such as a high NA photography or microscope lens. The focal length of the first lens can vary based on the application and device requirements, including expected sample size, working distance, and so on. For a small form-factor SSR spectrometer, the focal length of the first lens can be as small as 2 mm; for other applications, it can be longer than 100 mm. Likewise, the working distance can range from 1-100 mm. Photography and microscopy lenses have small aberrations over a wide field-of-view, which can be useful when the Raman light is collected from a large area.

Using a high-NA collection lens is not enough to guarantee high overall collection efficiency for the Raman analyzer. The first collection lens or lens system collects and collimates as much light as possible from the target (sample) and delivers it in a substantially collimated form to the rest of the SSR spectrometer's detection system (the filter for selecting the Raman wavelength(s) and the detector). To maintain high overall collection efficiency, the optical elements between the first collection lens and the detector should not block or otherwise attenuate the collected Raman signal, except to reject stray light and light outside the Raman signal band.

Several of the SSR spectrometer's structural features help to maintain a high etendue. These structural features include: 1) high etendue optical filters (e.g., band-edge filter 250 and band-pass filter 260 in FIG. 2B) for Raman emission selection with wide illumination acceptance cone-angle and large area; 2) use of short optical paths (distance from the collection to imaging lens) to allow for a broader cone-angle of the Raman light to reach the filters and detector (a longer optical path can spatially filter rays that are not parallel to the axis); and 3) use of a high-NA imaging (focusing) lens (e.g., second lens 232 in FIG. 2B) and a detector wide enough to receive the entire Raman light that is passed through the optical chain.

Figure 3A:
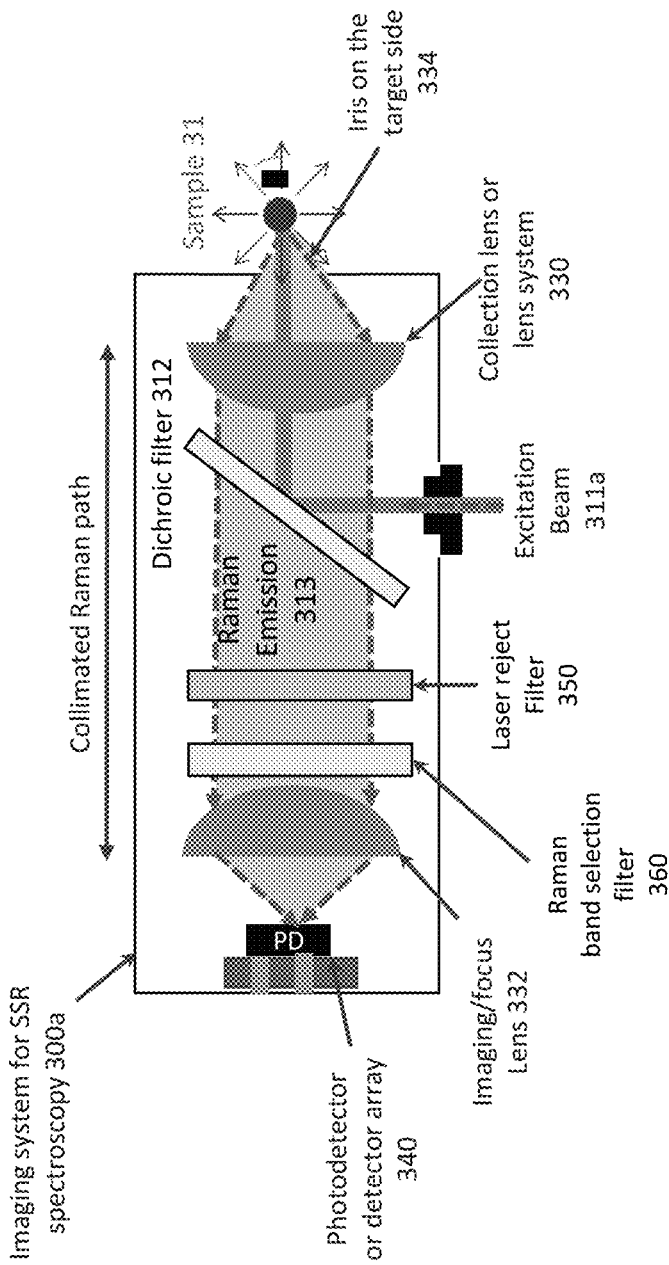
FIG. 3A shows a compact SSR spectroscopy system with high-throughput bulk optics and an excitation beam that propagates along the same optical axis as the collected Raman emission.

FIG. 3A shows an SSR spectrometer 300a with a light collection-detection system that includes these structural features for high optical throughput. The SSR spectrometer 300a includes a high-NA lens 330 that focuses an excitation beam 311a on or in a target 31 and collects Raman emission 313 from the target 31. For this purpose, the excitation laser 311a is bounced off of a dichroic filter 312 tilted at roughly 45 degrees with respect to the SSR spectrometer's optical axis and is focused on the sample 31 using the high-NA collection lens 330. The same lens 330 collects the Raman emission 313 from the target 31 and collimates it towards filters 350 and 360 in the collection-detection chain.

The divergence of the collimated Raman emission may be less than the acceptance angles of the filters 350 and 360. These angles may be about 1-3 degrees depending of the passband of the filter. Blooming of the sample due to scattering could cause the Raman emission beam divergence to be 10 degrees or more. If the divergence is this large, the system may include a pinhole in front of the sample to limit the divergence to roughly 1 degree.

The first filter 350 rejects the excitation light that is scattered back into the collection path. This first filter 350 may be a long-pass filter for Stokes Raman spectroscopy or a short-pass filter for anti-Stokes Raman spectroscopy. The second filter 360 is a spectrally selective filter that selects the Raman wavelength or wavelengths of interest for SSR spectroscopy. Since the second filter 360 is spectrally selective (e.g., it could be a narrow-band filter), its spectral response can be very sensitive to angle of incidence—e.g., its passband may shift with angle of incidence. Therefore, this second filter 360 could have a limited illumination acceptance cone-angle in order for its spectral response to be bound to the range of interest—e.g., for the full-width half-maximum (FWHM) of the second filter's passband to be equal to or less than 1 nm.

To maintain high optical throughput, the second filter 360 should have the widest possible acceptable illumination cone-angle (e.g., a half angle of about 2-3 degrees for a FWHM of about 1-1.5 nm). Alternatively, or in addition, the Raman beam 313 should be as well-collimated as possible to avoid illuminating the second filter 360 at angles outside its illumination acceptance cone-angle.

The portion of the Raman emission that passes through filters 350 and 360 is focused by the second lens 332 onto the detector 340. The size of this detector 360 along with the NA of the second lens 332 determines the etendue of the detector 360. To make the detector's etendue as high as possible, the detector 340 should have a large active area and the lens 332 should have a high NA. If the focal lengths and diameters of the collection lens 330 and focusing lens 332 are similar (e.g., as in a 1-to-1 imaging system), then the detector's active area should be about as large as the Raman emission area (e.g., a few millimeters in diameter for a highly scattering target 31). If the collection lens 330 and focusing lens 332 magnify the sample 31, then the detector's active area should be scaled by the magnification.

In most practical SSR spectrometers, the illumination acceptance cone-angle of the spectrally selective filter 360 limits the system etendue. Typically, a narrowband filter with a passband whose FWHM is less than 2 nm has a cone-half-angle acceptance of about 1-2 degrees. Using the acceptance cone-angle efficiently increases the SSR spectrometer's optical throughput, making the SSR spectrometer more sensitive.

Figure 3B:
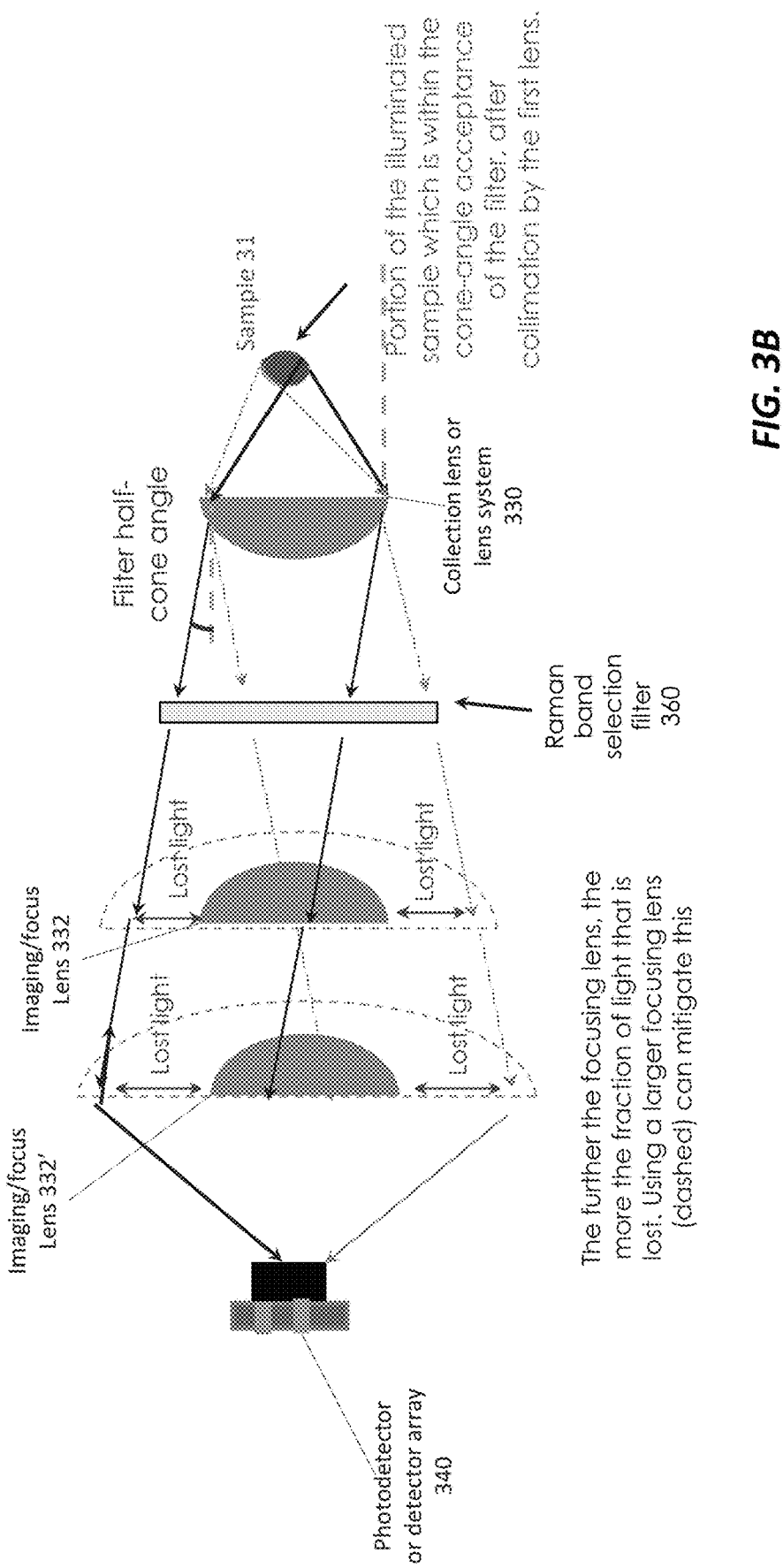
FIG. 3B illustrates how the compact SSR spectroscopy system of FIG. 3A collects and detects Raman light from different points on a sample.

FIG. 3B illustrates beam divergence and the effect of the location(s) of the optics on spectrometer throughput. It shows rays from two different points on the sample 31 propagating through the collection lens 330, filter 360, and imaging (focusing) lens 332 to the detector 340. As seen in FIG. 3B, the distance from the collection lens 330 to the imaging (focusing) lens 332 and the divergence angle of the Raman beam 313 affect the SSR spectrometer's optical throughput. If the collection lens 330 collimates the Raman emission 313 perfectly, then this distance could be infinite. In practice, however, the collimated Raman emission 313 diverges due in part to the fact that Raman signal is emitted from a few millimeters of lateral extent from the sample. If the divergence angle is too large and/or the distance between the collection lens 330 and the imaging lens 332 is too long, then light that diverges too much may not reach the imaging lens 332 (see, e.g., the imaging lens at position 332').

In essence, the apertures surrounding the filters 350 and 360 and imaging lens 332 may spatially filter the diverging light, reducing optical throughput. If the collection lens 330 and imaging lens 332 each have a 1-inch (25 mm) diameter, aligning them properly and setting the distance between them to be less than about 150 mm should cause the Raman light 313 to fill the entire cone-half-angle (e.g., 1-2 degrees) of a typical thin-film optical filter 360. Similarly, increasing the diameter of the imaging lens 332 as shown in FIG. 3B mitigates this loss. Reducing the separation between the collection lens 330 and imaging lens 332 and/or increasing the diameter of the imaging lens 332 can lead to a system with no more than one aperture stop between the collection lens 330 and the detector 340.

Figure 3C:
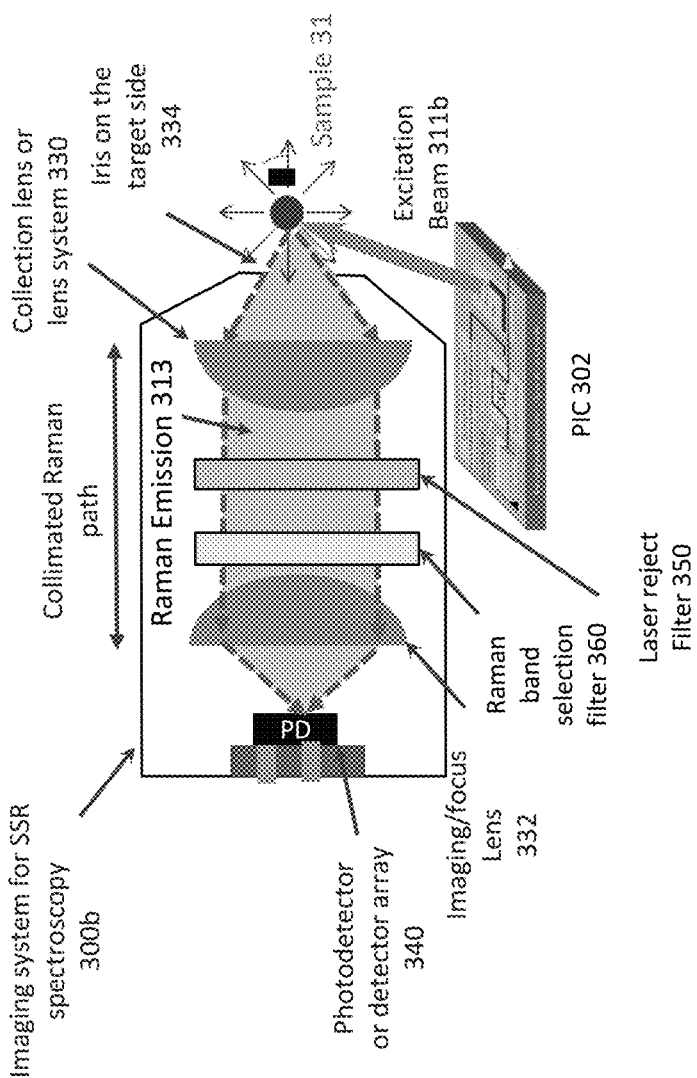
FIG. 3C shows a compact SSR spectroscopy system with high-throughput bulk optics and an excitation beam that illuminates the sample along a different axis than the SSR spectroscopy system's optical axis.

FIG. 3C shows an even more compact SSR spectrometer 300b. Instead of illuminating the sample 31 with an on-axis excitation beam 311a as in FIG. 3A, it illuminates the sample 31 with an off-axis excitation beam 311b generated by a tunable laser on a separate PIC 302. Off-axis excitation can work just as well as on-axis excitation because the sample 31 emits the Raman signal 313 isotropically. It also eliminates the need for a dichroic filter 312, making it possible to put the collection lens 330 closer to the imaging lens 332 and relaxing alignment tolerances for the lenses. For 25 mm diameter optics, the distance between the collection lens 330 and the imaging lens 332 can be about 125 mm (25 mm shorter than in the configuration of FIG. 3A). In addition, off-axis excitation may relax requirements on the laser reject filter's ability to reject ASE and unwanted excitation light (i.e., the laser filter 350 may have a lower extinction ratio). Using an off-axis excitation beam also reduces or illuminates of generating a Raman signal from the collection lens in response to focusing high-power excitation light. This means that the collection lens can be lower-quality (e.g., it can be made from BK7 glass or plastic) since it does not focus the off-axis excitation and therefore is not susceptible to generating a Raman emission itself in response to the excitation beam.

Increasing System Etendue with Meta-Materials for Filters and Lenses

As mentioned above, the throughput bottleneck of a practical SSR spectroscopy system may be the etendue of the spectrally selective optical filter. The filter's etendue can be increased by making the filter with meta-materials. Likewise, the lenses' NAs can be increased by using meta-materials instead of conventional bulk optical materials.

A thin-film filter's passband changes as a function of incidence angle: typically, as the incidence angle shifts away from normal incidence, the passband's center wavelength decreases. One factor that affects this angular variation in a thin-film filter's spectral response is the refractive index of the materials used in the filter, with materials having larger refractive indices being less sensitive to incidence angle.

Given the upper limit to the refractive index of the dielectrics that are typically used for the fabrication of thin-film filters (SiN, SiON, $TiO_2$, $Ta_2O_5$, etc.), there is a practical limit to the minimum achievable angular sensitivity.

Meta-materials, such as thin dielectric films patterned with subwavelength features, can have much higher effective refractive indices than bulk dielectric materials. They can be used to make a photonic-crystal surface-illuminated filter, which is designed and fabricated by patterning a single layer of dielectric or semiconductor material. The spectral response of this type of filter can be ten times less sensitive to angle of incidence than a conventional thin-film filter (i.e., a photonic crystal filter can have a cone-angle acceptance that is ten times greater than that of a conventional thin-film filter). Using a photonic crystal filter in an SSR spectroscopy system could therefore increase the system's etendue by up to a factor of 100 (etendue increases with the square of the NA).

In most optical systems—including spectrometer-based Raman systems—broadband collection optics (lenses, filters, etc.) collect the entire spectrum of light emitted or reflected from the object or sample. In an SSR spectrometer, however, the Raman emission is detected over a relatively small range of wavelengths (the passband of the spectrally selective filter). This means that the collection optics can be implemented as non-traditional optical components whose performance is optimized for maximum collection efficiency over the wavelength range of interest.

One such component is a meta-lens design with an ultra-high NA (e.g., an NA close 1.0) for collection and detection. A meta-lens utilizes sub-wavelength optical nano-structures to bend and focus incident light with much more flexibility than a conventional spherical or aspheric lens. One challenge for meta-lenses is broadband operation, which does not pose a problem for a narrow-band optical system like an SSR spectrometer. Therefore, meta-lenses with ultra-high NAs can be employed as collection and imaging lenses in an SSR spectrometer to further improve the etendue over conventional discrete lenses. Other functions can also be embedded in the meta-lens through the design of the nano-structures, including polarization sensitivity, spectral filtering, and spatial filtering.

FIGS. 4A-4C illustrate detection optics with conventional and non-traditional optical components for increased light collection. In FIG. 4A, a bulk optical lens 430 collimates Raman light 413 that is filtered by a narrowband, spectrally selective thin-film filter 460. Another bulk optical lens (not shown) focuses the filtered, collimated Raman light 413 onto a large-area detector 440. In FIG. 4B, a meta-lens 432 collimates the Raman light 413, and a spectrally selective photonic-crystal filter 462 filters the collimated Raman light 413. As explained above, the meta-lens 432 and photonic-crystal filter 462 can have larger NAs than their conventional counterparts, at least over the passband of the photonic-crystal filter 462. And in FIG. 4C, a photonic crystal detector 442 combines the functions of the spectrally selective filter and the large-area detector 440 by filtering and detecting incident collimated Raman light 413.

Using Filter Angle Response to Derive More Spectral Information

An SSR spectrometer may use the angular response of the spectrally selective optical filter to derive more spectral information from the detected Raman signal. As mentioned above, the passband of the spectrally selective filter shifts to shorter wavelengths as the angle of incidence increases. When rays of light at different angles pass through the spectrally selective filter, the imaging lens focuses them to different locations on the detector plane. If the detector is a multi-element detector array with a large enough active area, it can sense the off-axis portion of the Raman light. The spatial distribution of the Raman signal in the detector plane can be mapped to different wavelengths based on the shift in the spectrally selective filter's passband with incidence angle.

Figure 5:
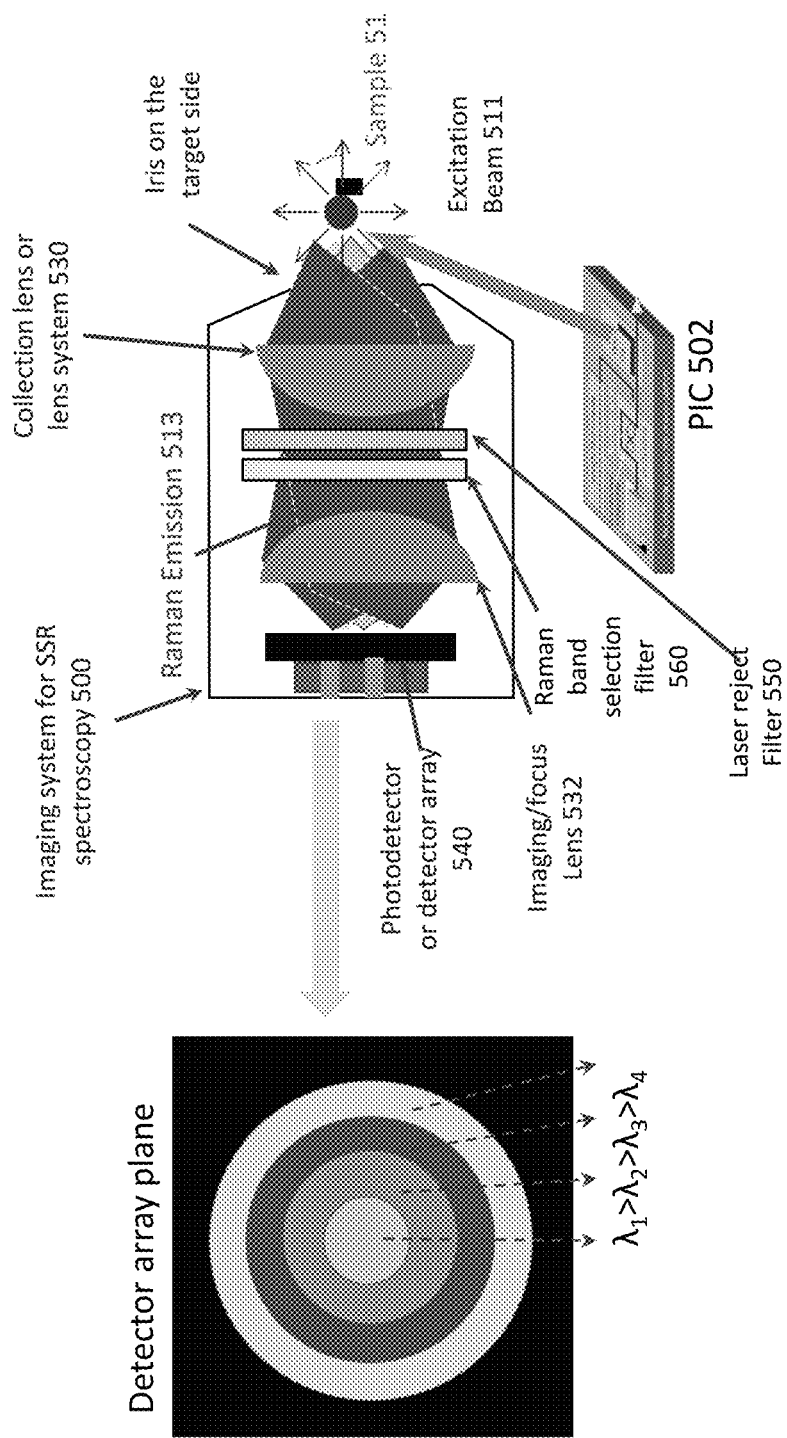
FIG. 5 illustrates how the spatial distribution of the collected Raman signal on a large area detector in a compact SSR spectroscopy system can be used to determine the spectrum of the Raman signal.

FIG. 5 shows a compact SSR spectrometer 500 that exploits the shift in the spectrally selective filter's passband with incidence angle. Like the compact SSR spectrometer 300b in FIG. 4B, respectively, the compact SSR spectrometer 500 in FIG. 5 includes a PIC 502 that illuminates a sample 51 with an off-axis, wavelength-swept excitation beam 511. The sample 51 emits Raman light in response to the excitation beam 511. The illuminated sample 51 blooms due to scattering of the excitation signal 511 and therefore emits Raman light from an area with a diameter of roughly 3-8 mm. Raman emission 513 from this patch is collected by a collection lens 530 and passed through a band-edge filter 550 and a spectrally selective bandpass filter 560. These filters 550 and 560 are placed close together to reduce length. A focusing lens 532 images the Raman emission 513 on a detector array 540.

At every excitation wavelength, this SSR spectrometer 500 collects the Raman light 513 over a band of 5-20 nm (based on the filter properties and the range of angles collected and allowed in the SSR spectrometer 500) and resolves it with the spectral resolution of the band-pass filter 560 (e.g., better than 2 nm). As the wavelength of the excitation beam 511 is swept, the spectral band over which the Raman spectrum is acquired is swept as well. These short-span Raman spectra are combined to construct the overall Raman spectrum. This SSR spectrometer 500 can have an optical throughput that is 100 times higher than that of a typical single-element-detector SSR system.

Raman light emitted from different locations on the object plane (sample 51) travels through different angles after passing through the first lens 530 and therefore sees different spectral responses from the bandpass filter 560. This is shown at left in FIG. 5 by the bulls-eye pattern on the detector plane. Each concentric annular region (ring) in the detector array 540 receives Raman light at a different wavelength. FIG. 5 shows four discrete regions corresponding to wavelengths λ1>λ2>λ3>λ4. In practice, the wavelength variation may be continuous and extend over a particular band. For example, the spectral response may vary with incidence angle nonlinearly, such that it shifts at a higher rate farther from normal incidence, with a shirt of roughly 10 nm over an angular range of about 10-15 degrees.

Since the angular response of the passband filter 560 and the focal length of the second lens 532 determine which wavelength is received at each point on the detector plane, the entire output of the detector array 540 can be used for the measurement of Raman spectrum. In this configuration, the bandpass filter 560 and detector array 540 function as a very high throughput spectrometer with a limited wavelength span, e.g., less than 25 nm. This allows the SSR spectrometer 500 to use more than 20 degrees of cone half-angle at the bandpass filter 560, which can increase the useful etendue of the bandpass filter 560 by a factor of more than 100. To fully accommodate such wide angular spread the distance between the collection lens 530 and the focusing lens 532 should be short as explained above, e.g., less than 50 mm long for a system built with 25 mm diameter lenses.

A Wavemeter for Measuring Excitation Beam Wavelength

Figure 6:
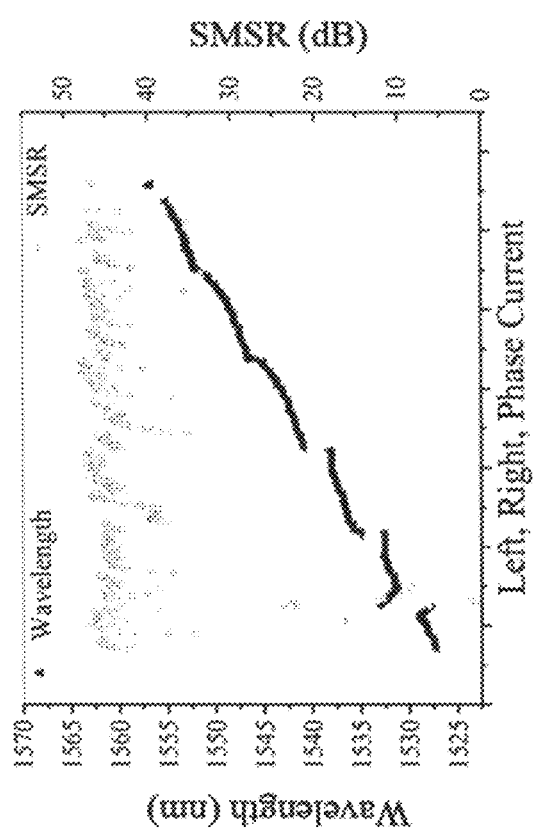
FIG. 6 is a plot of output wavelength versus input current for a tunable laser, with discontinuities representing mode hops in the tunable laser's output.

Making a tunable laser that sweeps linearly, repeatably, and controllably over a broad band is difficult and expensive. Rather than use such a laser, an SSR spectrometer uses a computational wavemeter to make absolute wavelength measurements, with sub-nanometer wavelength precision, of the output of a tunable laser that might not sweep continuously or linearly. For example, an SSR spectrometer can use a tunable laser whose output wavelength varies with drive current as shown in FIG. 6. This tunable laser's output wavelength sweeps nonlinearly and discontinuously, with sharp jump representing mode hops in the output.

The wavemeter can be implemented using on-chip photonic circuits (e.g., interferometers and resonators) or through out-of-plane diffraction and detection (e.g., using on-chip diffraction gratings for dispersing light out of the chip and detecting the dispersed light in free space) as shown in FIG. 2B.

The use of a wavemeter in an SSR spectroscopy system offers the ability to: (1) tolerate mode hops like those shown in FIG. 6 in the excitation beam, allowing the use of lower cost and less complex tunable laser designs; and (2) use of adaptive, potentially non-continuous wavelength tuning with jumps in between wavelength bands for reducing the Raman spectrum acquisition time. In contrast, a swept-source system for optical coherence tomography (OCT) or lidar may use a Fabry-Perot etalon for estimating its output wavelength. This technique only allows for tracking and monitoring a continuous wavelength sweep across the entire tuning range. Therefore, mode hops cannot be tolerated, and non-continuous sweeps cannot be used. These lead to more expensive tunable laser designs and potentially longer acquisition times. In addition, a Fabry-Perot etalon cannot account for the aging of the laser or drift of the laser wavelength over time.

Figure 7B:
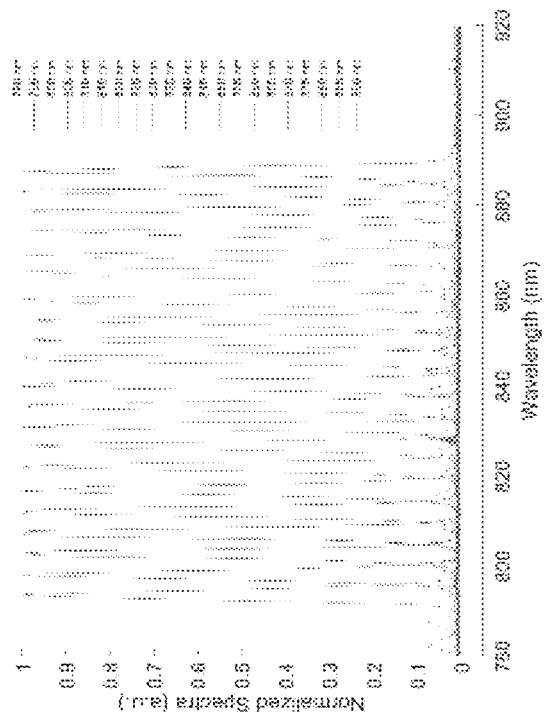
FIG. 7B is a plot of a reconstructed spectrum measured with the Talbot wavemeter of FIG. 7A.
Figure 7A:
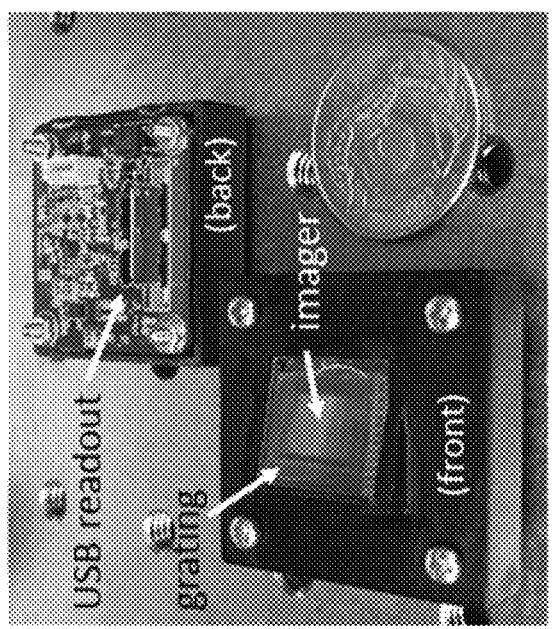
FIG. 7A is a photograph of a Talbot wavemeter for measuring absolute wavelength of the excitation beam emitted by a tunable source in an SSR spectroscopy system.

FIG. 7A shows a Talbot spectrometer/wavemeter with a webcam CMOS imager that achieves, sub-nanometer spectral resolution and a span of >100 nm. It can be used in an example SSR spectroscopy system to measure the absolute wavelength of the laser as described above. FIG. 7B is a plot of a reconstructed spectrum acquired with this spectrometer/wavemeter. This reconstructed spectrum has a bandwidth of over 100 nm with a resolution of less than 1 nm.

The wavemeter can also be implemented entirely on the chip without off-chip diffraction. An on-chip wavemeter can include an arrayed waveguide grating (AWG), on-chip Echelle grating, micro-resonator array, or photonic crystal super-prism. A cascaded combination of these devices can also be used to achieve the performance desired for the wavemeter.

Wavelength Calibration with and without a Wavemeter

Measuring the output wavelength of the tunable laser makes it possible to calibrate the tunable laser and to monitor the Raman shift in real-time for accurately identifying the sample's chemical composition. While real-time monitoring of wavelength involves a wavemeter or a spectrometer, wavelength calibration can be performed with a wavemeter or spectrometer or with a reference material. This reference material has a known (preferably strong) set of Raman peaks that could be used before every test, periodically, or as desired to calibrate the wavelength of the laser and Raman shift. This reference material could be a pure material or a mix of several materials in solid or liquid form.

Laser Wavelength Tuning Over 50 nm or Less

As mentioned above, an SSR spectroscopy system can use a tunable laser whose output sweeps non-linearly, non-continuously, and/or non-repeatably. The laser sweep can be up to 1000 thousand times slower than for SS OCT and lidar. For instance, a general-purpose SSR spectrometer may have a wavelength tuning range on the order of 50 nm to acquire enough information to enable unique identification of materials. If the Raman shift range covered by the tunable laser is not wide enough, two materials may not be distinguishable from one another if their Raman emission spectra are similar over the laser's tuning range. In other scenarios, however, a small wavelength tuning range of the laser, for example, smaller than 50 nm, could be acceptable. These scenarios include: 1) identification of a small set of materials; and 2) excitation wavelengths in the visible and UV regime of the electromagnetic spectrum.

An SSR analyzer for identifying a specific material or set of materials could operate over a relatively narrow wavelength tuning range (for example, less than 50 nm) and Raman shift span. For example, an SSR device built for identification of a very specific water contaminant or street drug may use a relatively small Raman shift span to identify the target molecule. The exact range could depend on the complexity of the mixture containing the target molecule. If the realm of possibilities could be narrowed down (for example, if the list of all possible cutting agents for street drugs could be constructed) then this identification could be carried out with a high success rate even with an SSR analyzer that covers a small Raman shift span.

Another SSR analyzer with a short wavelength tuning range is a device that operates with excitation wavelengths in the visible and ultraviolet (UV) range. The Raman shift span is the metric that determines the spectral coverage of the SSR spectrometer. While the Raman shift span is measured in wavenumbers (proportional to frequency shift), the laser tuning range is usually measured in wavelength (inversely proportional to frequency). The frequency shift is proportional to the wavelength shift divided by the wavelength squared, $\Delta f \propto \Delta \lambda / \lambda^2$, suggesting that the Raman shift span measured in wavenumber or frequency could be wider at shorter center wavelengths for the same wavelength tuning range.

For example, a tunable laser whose tuning range is 50 nm at a center wavelength of 500 nm can cover four times more Raman shift than the same tuning range near a 1-micron center wavelength. At UV center wavelengths (e.g., 250 nm), a 50 nm wavelength tuning range can produce roughly sixteen times more Raman shift than the same tuning range at a 1-micron center wavelength. In fact, near an excitation wavelength of 250 nm, only 35 nm of tuning range is enough to cover from a Raman shift of 0 cm-1 to 4000 cm-1, which is the entire useful span for Raman spectroscopy. Therefore, it is possible to build full-spectrum Raman analyzers in the visible and UV range with tuning range smaller than 50 nm.

Adaptive Wavelength Tuning

The ability to use a wavelength sweep that is non-continuous allows an SSR spectrometer to use a variety of adaptive algorithms for extracting the Raman spectrum more efficiently. In most applications, the Raman spectrum is sparse, meaning that the information is concentrated in certain wavelength regions. Also, Raman peaks could be close together in certain regions of the spectrum and farther apart in other regions. Adaptive wavelength tuning allows for adjusting the wavelength sweep resolution to either differentiate closely located Raman peaks or sweep more quickly over regions in which the peaks are far apart. Put differently, an adaptively tuned laser may sweep slowly across spectral regions that are information rich and quickly across spectral regions that have little to no information. Adaptive wavelength tuning allows for increasing or maximizing information extraction from the Raman spectrum for a given acquisition time and for tailoring or optimizing the wavelength sweep for different spectroscopy tasks (e.g., quick chemical identification, estimation of concentration of biochemicals in solution, etc.).

Adaptive spectral sampling is a technique developed for cognitive or software-defined radios that can be used to optimally sample the Raman spectrum in the least possible time. One implementation is using a fast sweep to acquire a low SNR spectrum and then sequentially sampling sub-regions of the spectrum to improve the SNR where there is especially high-value spectral content. This yields a spectrum with increased or maximal SNR in information-rich portions of the spectrum without long integration times at every spectral data point.

SSR spectroscopy at video rates using adaptive sampling may use repeated spectral scans within 100 ms. For this to work, the Talbot wavemeter may operate at this higher scan rate using high scan-rate line-scan sensors for faster wavelength readout of the tunable laser. A Talbot spectrometer with a CMOSIS line-scan sensor can achieve 150 kHz of wavelength readout rate at 0.1 nm resolution.

Applications of SSR Spectroscopy

Applications for SSR spectroscopy range from material measurements, to security screening, pharmaceuticals, and medicine. Our SSR approach simultaneously improves performance and reduces cost, making possible to deliver laboratory quality data at form factors and cost-points that are competitive with portable Raman analyzers. The 100-fold improvement in sensitivity (by increasing the light gathering power) coupled with the cost reduction (eliminating the spectrometer) enables a transition from bench-top instruments to portable instruments without sacrificing resolution and sensitivity.

This smaller size and improved performance may be especially useful for portable Raman spectroscopy, which is a fast-growing segment of the Raman spectroscopy market. Unfortunately, the utility of current portable Raman spectrometers is limited due to their high cost (e.g., an average instrument cost of $40,000) and lower sensitivity and resolution than laboratory instruments. Our SSR spectroscopy technology makes portable Raman spectroscopy practical for a variety of application, including medical diagnostics.

Raman spectroscopy is becoming more and more popular for medical diagnostics. Between 2002 and 2016, over 31 Raman spectroscopy clinical trials (with more than 50 patients) were conducted for diagnosing a variety of diseases. The number of clinical trials that have been published and are underway continues to grow in number. TABLE 2 below shows the results from six large (>100 patients) clinical trials for several different disease indications. While there are no FDA approved applications for Raman spectroscopy, the early results are promising. A high-performance, lower-cost Raman system could meet the needs for clinical diagnostics as the medical Raman market grows.

TABLE 2

Clinical Trial Results

| Disease Type | Group | Publication Year | Patient Number | Specificity (%) | Selectivity (%) |
|---|---|---|---|---|---|
| Barrett's esophagus | Huang et al | 2014 | 373 | 87 (high grade | 84.7 |
| Cervical precancer | Mahadevan-Jansen et al. | 2011 | 172 | 96.5 (dysplasia) | 97.8 |
| GI cancer | Huang et al. | 2011 | 164 | 92.5 (beveled probe) | 93.1 (beveled probe) |
| GI cancer | Huang et al. | 2014 | 450 | 81.3 (prospective | 88.3 |
| Oral cancer | Gupta et al. | 2014 | 199 | 96 (malignant) | 99 (normal) |
| Skin cancer | Zeng et al. | 2012 | 453 | 90 (cancer vs. benign) | 64 |

Inventive SSR spectroscopy techniques can be readily extended to new sensing modalities. These modalities include but aren't limited to spectroscopy solutions aimed at biomedical applications, especially for applications of Raman spectroscopy for digital pathology and surgical guidance (e.g., for brain tumor resection). Our SSR technology can offer cost effective instruments for a wide range of clinical applications and improve the quality of treatment and patient care.

Components of inventive SSR spectroscopy systems can be used for other applications as well. For instance, the Talbot wavemeter can be used as a general-purpose spectrometer. While it has limited light-gathering power (comparable to a miniature dispersive spectrometer), the Talbot spectrometer can be readily used in applications where the signal levels are higher than Raman sensing, including Laser Induced Breakdown Spectroscopy (LIES) and fluorescence spectroscopy. SSR technology could also reduce the cost and improve the performance of fluorescent immunoassay analyzers. A low-cost Talbot spectrometer can easily offer the resolution and optical throughput needed for this application at a fraction of the cost of today's spectrometers.

Likewise, the swept source and wavemeter could be used as a low-cost, wavemeter-enabled tunable source for swept source optical coherence tomography (SS-OCT) or lidar. SS-OCT has become the preferred modality due to higher quality images (higher SNR) and faster scan rates than other OCT modalities. Current SS-OCT tunable sources rely on multiple chips, are complex, are not compatible with batch manufacturing techniques, and offer no prospect for considerable cost reductions in future. In contrast, chip-scale wavemeters can be used to correct for the sweep nonlinearities and mode hopping in lower-cost, single-chip tunable sources.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used.

The foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising:
    a tunable laser to emit a tunable excitation beam with a wavelength tuning range of 50 nm or less;
    a wavelength sensor, in optical communication with the tunable laser, to measure a wavelength of the tunable excitation beam;
    a band-edge filter, in optical communication with the tunable laser, to reject at least a portion of amplified spontaneous emission from the tunable laser, wherein a passband of the band-edge filter overlaps with the wavelength tuning range of the tunable laser;
    a spectrally selective detector to detect a Raman signal emitted by a sample in response to excitation with the tunable excitation beam; and
    a processor, operably coupled to the wavelength sensor and the spectrally selective detector, to determine a Raman spectrum of the sample based on the Raman signal and the wavelength of the tunable excitation beam.

2. The system of claim 1, wherein the wavelength tuning range is at most 35 nm, and a center wavelength of the tunable excitation beam is an ultraviolet (UV) wavelength.

3. The system of claim 2, wherein the processor is further configured to determine the Raman spectrum with a Raman shift of up to 4000 $cm^{-1}$.

4. The system of claim 1, wherein a center wavelength of the tunable excitation beam is a visible light wavelength.

5. The system of claim 1, wherein the processor is further configured to determine the Raman spectrum with a resolution finer than 1 nm.

6. The system of claim 1, wherein the tunable laser is configured to tune the tunable excitation beam across the wavelength tuning range in less than one second.

7. A method of detecting a target substance with a known Raman spectral response in a sample, the method comprising:

emitting a tunable excitation beam with a wavelength tuning range of 50 nm or less, the wavelength tuning range selected based on the known Raman spectral response;

applying the tunable excitation beam to the sample while measuring a wavelength of the tunable excitation beam;

detecting a Raman signal emitted by the sample in response to the tunable excitation beam;

determining a Raman spectrum of the sample based on the Raman signal and the wavelength of the tunable excitation beam; and determining a presence or an absence of the target substance in the sample based on the Raman spectrum.

8. The method of claim 7, wherein the emitting includes emitting the tunable excitation beam with a center wavelength selected from an ultraviolet (UV) wavelength and a visible light wavelength.

9. The method of claim 8, wherein the wavelength tuning range is at most 35 nm, and wherein the determining the Raman spectrum includes determining the Raman spectrum with a Raman shift of up to 4000 cm'.

10. The method of claim 7, wherein the determining the Raman spectrum includes determining the Raman spectrum with a resolution finer than 1 nm.

11. A method of measuring a Raman spectrum of a sample, the method comprising:

emitting a swept laser beam from a tunable laser towards a sample;

collecting Raman light emitted by the sample in response to the nonlinearly swept laser beam;

transmitting the Raman light through a filter having a transmission that varies in wavelength as a function of an incidence angle of the Raman light on the filter;

detecting, with a detector, a spatial distribution of the Raman light; and estimating the Raman spectrum of the sample based on the spatial distribution of the Raman light.

12. The method of claim 11, wherein a passband of the filter shifts to shorter wavelengths at larger values of the incidence angle.

13. The method of claim 11, wherein the transmission of the filter varies nonlinearly with the incidence angle.

14. The method of claim 11, wherein the filter is a photonic crystal filter.

15. The method of claim 11, wherein the emitting includes sweeping the laser beam over a set of excitation wavelengths, wherein the detecting includes, for each excitation wavelength of the set of excitation wavelengths, detecting the spatial distribution of the Raman light emitted by the sample in response to that excitation wavelength to detect a set of spatial distributions of the Raman light, and wherein estimating the Raman spectrum includes reconstructing the Raman spectrum based on the set of spatial distributions of the Raman light.

16. The method of claim 11, wherein the incidence angle is a first incidence angle of a set of incidence angles defined by the Raman light on the filter, wherein the transmission of the filter is different for each incidence angle of the set of incidence angles, and wherein the spatial distribution of the Raman light is a wavelength distribution that maps to the transmission of the filter.

17. A system, comprising:

a tunable laser to emit a swept laser beam towards a sample along a first axis;

a filter having a transmission that varies in wavelength as a function of an incidence angle of the Raman light on the filter, to receive and filter the Raman light;

a detector to receive the Raman light from the filter and to detect a spatial distribution of the Raman light; and a processor, operably coupled to the detector, to estimate a Raman spectrum of the sample based on the spatial distribution of the Raman light.

18. The system of claim 17, wherein the transmission of the filter varies nonlinearly with the incidence angle.

19. The system of claim 17, wherein the tunable laser is further configured to emit the laser beam by sweeping the laser beam over a set of excitation wavelengths, wherein the detector is further configured to detect the spatial distribution by detecting, for each excitation wavelength of the set of excitation wavelengths, the spatial distribution of the Raman light emitted by the sample in response to that excitation wavelength to detect a set of spatial distributions of the Raman light, and wherein the processor is further configured to estimate the Raman spectrum by reconstructing the Raman spectrum based on the set of spatial distributions of the Raman light.

20. The method of claim 17, wherein the incidence angle is a first incidence angle of a set of incidence angles defined by the Raman light on the filter, wherein the transmission of the filter is different for each incidence angle of the set of incidence angles, and wherein the spatial distribution of the Raman light is a wavelength distribution that maps to the transmission of the filter.

* * * * *

UNITED STATES PATENT AND TRADEMARK OFFICE
CERTIFICATE OF CORRECTION

PATENT NO. : 11,307,092 B2
APPLICATION NO. : 16/853811
DATED : April 19, 2022
INVENTOR(S) : Amir H. Atabaki, Rajeev J. Ram and William F. Herrington It is certified that error appears in the above-identified patent and that said Letters Patent is hereby corrected as shown below:

In the Claims

In Claim 9, Line 21, replace "up to 4000 cm'" with -- up to 4000 cm–1 --

Signed and Sealed this
Twelfth Day of July, 2022

Katherine Kelly Vidal
*Director of the United States Patent and Trademark Office*